US012801742B2

(12) United States Patent
Kim et al.

(10) Patent No.: US 12,801,742 B2
(45) Date of Patent: Nov. 17, 2026

(54) ARTIFICIAL INTELLIGENCE DEVICE BASED ON TRUST ENVIRONMENT

(71) Applicant: University Industry Foundation, Yonsei University, Seoul (KR)

(72) Inventors: Youngsok Kim, Seoul (KR); Jinwoo Choi, Seoul (KR); Chaemin Lim, Seoul (KR); Suhyun Lee, Seoul (KR); Dokyung Song, Seoul (KR); Jinho Lee, Seoul (KR)

(73) Assignee: UNIVERSITY INDUSTRY FOUNDATION, YONSEI UNIVERSITY, Seoul (KR)

( * ) Notice: Subject to any disclaimer, the term of this patent is extended or adjusted under 35 U.S.C. 154(b) by 391 days.

(21) Appl. No.: 18/229,765

(22) Filed: Aug. 3, 2023

(65) Prior Publication Data

US 2024/0370563 A1 Nov. 7, 2024

(30) Foreign Application Priority Data

May 4, 2023 (KR) ........................ 10-2023-0058605

(51) Int. Cl.

*G06F 21/57* (2013.01)
*G06F 13/28* (2006.01)
*G06F 21/60* (2013.01)

(52) U.S. Cl.

CPC .............. *G06F 21/57* (2013.01); *G06F 13/28* (2013.01); *G06F 21/602* (2013.01)

(58) Field of Classification Search

CPC ......... G06F 21/57; G06F 13/28; G06F 21/602
See application file for complete search history.

(56) References Cited

U.S. PATENT DOCUMENTS 10,956,584 B1 * 3/2021 Heaton ................. G06F 21/602
11,847,507 B1 * 12/2023 Borkovic ................ G06F 9/522

(Continued)

FOREIGN PATENT DOCUMENTS

JP 2005-018434 A 1/2005
KR 10-2022-0097330 A 7/2022
KR 10-2474875 B1 12/2022

OTHER PUBLICATIONS

Korean Office Action for related KR Application No. 10-2023-0058605 mailed Sep. 23, 2025 from Korean Intellectual Property Office.

(Continued)

*Primary Examiner* — Kaveh Abrishamkar
*Assistant Examiner* — Alan L Kong
(74) *Attorney, Agent, or Firm* — Paratus Law Group, PLLC

(57) ABSTRACT

An artificial intelligence (AI) device based on a trust environment, includes a first type memory configured to transmit encrypted input data and receive encrypted output data, and a trust AI processing unit configured to operate in a trust space and perform AI computation of the encrypted input and output data. The trust AI processing unit includes: a cryptographic processing front-end processor configured to generate decrypted input data through decryption of the encrypted input data and perform encryption of non-encrypted output data to generate the encrypted output data, a second type memory configured to provide a buffer for the decrypted input data and the non-encrypted output data, and a processor configured to perform a neural network computation based on the decrypted input data to generate the non-encrypted output data.

13 Claims, 16 Drawing Sheets

(56) References Cited

U.S. PATENT DOCUMENTS

| | | | | |
|---|---|---|---|---|
| 2020/0293859 | A1* | 9/2020 | Mody | G06N 3/0464 |
| 2020/0401540 | A1* | 12/2020 | Birsan | G06F 13/28 |
| 2021/0182222 | A1* | 6/2021 | Han | G06F 12/0875 |
| 2022/0230058 | A1* | 7/2022 | Bai | G06N 3/084 |
| 2024/0281393 | A1* | 8/2024 | Lai | G06F 13/28 |

OTHER PUBLICATIONS

Andres Ortiz et al., "A new Offloaded/Onloaded network interface for high performance communication", 17th Euromicro International Conference on Parallel, Distributed and Network-based Processing, 2009, pp. 143-150, IEEE, DOI: 10.1109/PDP.2009.29.

* cited by examiner

100

(a) Sequential 4-byte accesses (b) Random 4-byte accesses (a) AES-256-ECB (b) AES-256-CBC (a) Interrupt-driven offloading (b) DMA-driven offloading

FIG. 13

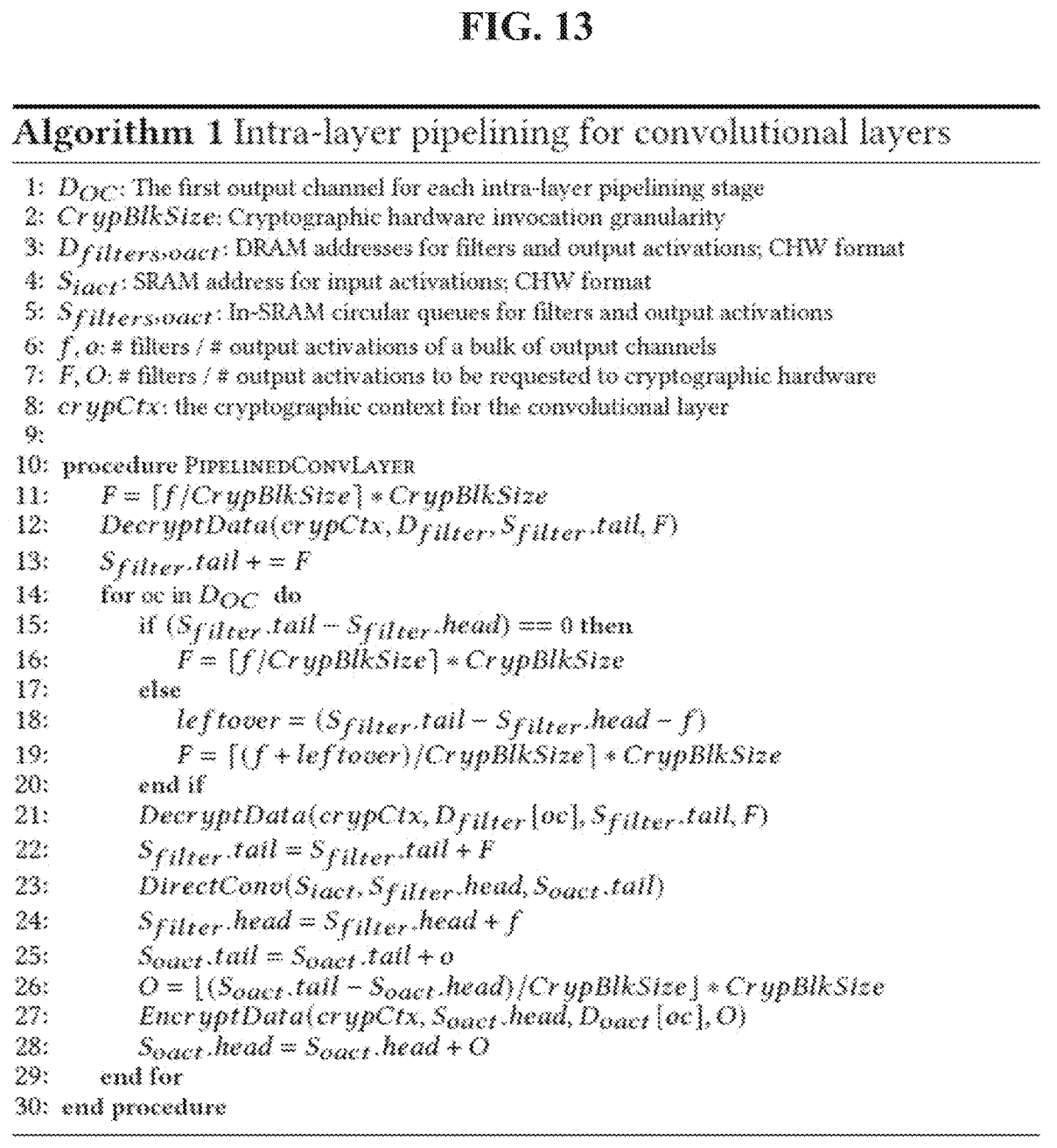

Algorithm 1 Intra-layer pipelining for convolutional layers

```
D_OC: The first output channel for each intra-layer pipelining stage
CrypBlkSize: Cryptographic hardware invocation granularity
D_filters,oact: DRAM addresses for filters and output activations; CHW format
S_iact: SRAM address for input activations; CHW format
S_filters,oact: In-SRAM circular queues for filters and output activations
f, o: # filters / # output activations of a bulk of output channels
F, O: # filters / # output activations to be requested to cryptographic hardware
crypCtx: the cryptographic context for the convolutional layer

procedure PIPELINEDCONVLAYER
    F = ⌈f/CrypBlkSize⌉ * CrypBlkSize
    DecryptData(crypCtx, D_filter, S_filter.tail, F)
    S_filter.tail += F
    for oc in D_OC do
        if (S_filter.tail − S_filter.head) == 0 then
            F = ⌈f/CrypBlkSize⌉ * CrypBlkSize
        else
            leftover = (S_filter.tail − S_filter.head − f)
            F = ⌈(f + leftover)/CrypBlkSize⌉ * CrypBlkSize
        end if
        DecryptData(crypCtx, D_filter[oc], S_filter.tail, F)
        S_filter.tail = S_filter.tail + F
        DirectConv(S_iact, S_filter.head, S_oact.tail)
        S_filter.head = S_filter.head + f
        S_oact.tail = S_oact.tail + o
        O = ⌊(S_oact.tail − S_oact.head)/CrypBlkSize⌋ * CrypBlkSize
        EncryptData(crypCtx, S_oact.head, D_oact[oc], O)
        S_oact.head = S_oact.head + O
    end for
end procedure
```

ARTIFICIAL INTELLIGENCE DEVICE BASED ON TRUST ENVIRONMENT

CROSS-REFERENCE TO PRIOR APPLICATION

This application claims priority to Korean Patent Application No. 10-2023-0058605 (filed on May 4, 2023), which is hereby incorporated by reference in its entirety.

ACKNOWLEDGEMENT

The present patent application has been filed as a research project as described below.

[National Research Development Project supporting the Present Invention]
[Project Serial No] 1711193986
[Project No] 2020-O-01361-004
[Department] Ministry of Science and ICT
[Project management (Professional) Institution] Institute of Information &
Communications Technology Planning & Evaluation
[Research Project Name] Information & Communication Broadcasting Research
Development Project
[Research Task Name] Artificial Intelligence Graduate School Support (Yonsei
University)
[Contribution Rate] 1/2
[Project Performing Institute] University Industry Foundation, Yonsei University
[Research Period] 2023.01.01 ~ 2023.12.31
[National Research Development Project supporting the Present Invention]
[Project Serial No] 1415177659
Project No] P0016150
[Department] Ministry of Trade, Industry and Energy
[Project management (Professional) Institution] Korea Institute for Advancement
of Technology
[Research Project Name] Industrial technology international cooperation (R&D)
[Research Task Name] Development of attack detection and defense technology
for smart IoT network security
[Contribution Rate] 1/2
[Project Performing Institute] Korea Electronics Technology Institute
[Research Period] 2021.12.01 ~ 2022.11.30

BACKGROUND

The present disclosure relates to an artificial intelligence (AI) neural network framework technology, and more particularly, to an AI device based on a trust environment, capable of safely accelerating the execution of an artificial neural network in a trust environment.

A deep neural network (DNN) is an artificial neural network including several hidden layers between an input layer and an output layer. DNNs have been widely used in mobile and embedded applications. In particular, DNNs are useful for applications that perform biometric authentication using users' biological characteristics (e.g., fingerprint, iris, face, etc.) to verify the users' identities.

Since DNNs include a lot of sensitive user data, mobile and embedded devices should implement a secure DNN execution environment that may safely protect users and DNN data from security attacks.

Previously, it was proposed to run DNNs in a trusted execution environment via TrustZone, a hardware-based security technology available in advanced RISC machine (ARM) processors. The TrustZone is a hardware-based security technology that protects important information by placing an independent security zone in a processor. However, running a DNN in the TrustZone alone does not fully protect data. This is because the TrustZone have limited memory protection. Using the TrustZone allows DNN execution to be separated from other processes by partitioning hardware and software resources into safe, general zones. Accessing data of secure zones from general zones may be prevented by hardware. However, because TrustZone maintains data unencrypted in volatile memory, physical security attacks, such as cold boot attacks, may obtain sensitive user and DNN data despite running the DNN in the TrustZone.

To protect data from physical attacks, data may be selectively encrypted and decrypted only in secure on-chip memory. This approach not only isolates DNN execution from other processes by using the TrustZone, but also protects users and DNN data from physical attacks through encryption. However, protecting encrypted data in memory may cause a problem in that slow memory access significantly increases and a DNN execution time significantly increases due to high data encryption/decryption overhead imposed on the processor.

Therefore, there is a need for a new secure DNN framework that may not only protecting sensitive users and DNN data from physical attacks, but also reduce the DNN execution time by overcoming slow memory access and high data encryption/decryption overhead.

RELATED ART DOCUMENT

Patent Document (Patent Document 1) Korea Patent No. 10-2474875 (2022.12.01)

SUMMARY

An embodiment of the present disclosure is to provide an artificial intelligence (AI) device based on a trust environment capable of safely accelerating the execution of an artificial neural network in a trust environment.

An embodiment of the present disclosure is to provide an AI device based on a trust environment capable of strengthening security from physical attacks by encrypting data in a trust space and reducing the number of memory accesses by performing direct convolution-based neural network computation.

An embodiment of the present disclosure is to provide an AI device based on a trust environment capable of utilizing processor resources limited in neural network execution operations by performing offloading to cryptographic hardware and shortening an artificial neural network execution time by overlapping with data encryption and decryption through intra-layer pipelining.

According to embodiments of the present disclosure, an artificial intelligence (AI) device based on a trust environment includes: a first type memory configured to transmit encrypted input data and receive encrypted output data; and a trust AI processing unit configured to operate in a trust space and perform AI computation of the encrypted input and output data, wherein the trust AI processing unit includes: a cryptographic processing front-end processor configured to generate decrypted input data through decryption of the encrypted input data and perform encryption of non-encrypted output data to generate the encrypted output data; a second type memory configured to provide a buffer for the decrypted input data and the non-encrypted output data; and a processor configured to perform a neural network computation based on the decrypted input data to generate the non-encrypted output data.

The cryptographic processing front-end processor may be configured to receive an encryption input activation and an encryption filter, as the encrypted input data, from the first type memory and store a decryption input activation and a decryption filter in the second type memory.

The cryptographic processing front-end processor may be configured to receive an on-demand request by the processor in the course of the AI computation and access the first type memory to import the encrypted input data.

The second type memory may have a relatively faster operating speed and a smaller storage capacity than the first type memory.

The processor may be configured to directly perform a convolution-based neural network computation to reduce the number of accesses to the first type memory.

The processor may be configured to regularly store a decryption input activation in the second type memory and store a decryption filter and a non-encryption output activation in a circular queue manner.

The processor may be configured to perform data transmission and reception with the first and second type memories through interrupt-driven offloading of the cryptographic processing front-end processor.

The processor may be configured to perform data transmission and reception with the cryptographic processing front-end processor and the first and second type memories through direct memory access (DMA)-driven offloading of a DMA controller.

The processor may be configured to implement intra-layer pipelining by performing the neural network computation to overlap with the encryption and decryption operations performed by the cryptographic processing front-end processor.

The processor may be configured to perform the neural network computation seamlessly by allowing the cryptographic processing front-end processor to perform a decryption operation of the encrypted input data in the middle of performing the neural network computation.

The processor may be configured to perform the neural network computation seamlessly by subdividing a data decryption operation, a calculation operation, and a data encryption operation for the intra-layer pipelining.

According to embodiments of the present disclosure, an artificial intelligence (AI) device based on trust environment includes: a first type memory configured to transmit encrypted input data; and a trust AI processing unit configured to operate in a trust space and perform an AI computation of the encrypted input data, wherein the trust AI processing unit includes: a cryptographic processing front-end processor configured to generate decrypted input data through decryption of the encrypted input data; a second type memory configured to provide a buffer for the decrypted input data and the non-encrypted output data; and a processor configured to perform a neural network computation based on the decrypted input data to generate the non-encrypted output data.

The processor may be configured to reduce the number of accesses to the first type memory by performing a direct convolution-based neural network computation.

The processor may be configured to regularly store a decryption input activation in the second type memory and store a decryption filter and a non-encryption output activation in a circular queue manner.

The processor may be configured to implement intra-layer pipelining by performing the neural network computation to overlap with the encryption and decryption operations performed by the cryptographic processing front-end processor.

The disclosed technology may have the following effects. However, it does not mean that a specific embodiment should include all of the following effects or only the following effects, so it should not be understood that the scope of the disclosed technology is limited thereby.

The artificial intelligence (AI) device based on a trust environment according to the present disclosure may safely accelerate the execution of an artificial neural network in a trust environment.

The AI device based on a trust environment according to the present disclosure may strengthen security from physical attacks by encrypting data in a trust space and reduce the number of memory accesses by directly performing convolution-based neural network computations.

The AI device based on a trust environment according to the present disclosure may utilize processor resources limited in neural network execution operations by performing offloading to cryptographic hardware and shorten an artificial neural network execution time by overlapping with data encryption and decryption through intra-layer pipelining.

BRIEF DESCRIPTION OF THE DRAWINGS

FIGS. 12 and 13 are diagrams illustrating the implementation of intra-layer pipelining in the process of performing neural network computations.

DETAILED DESCRIPTION

Figure 1:
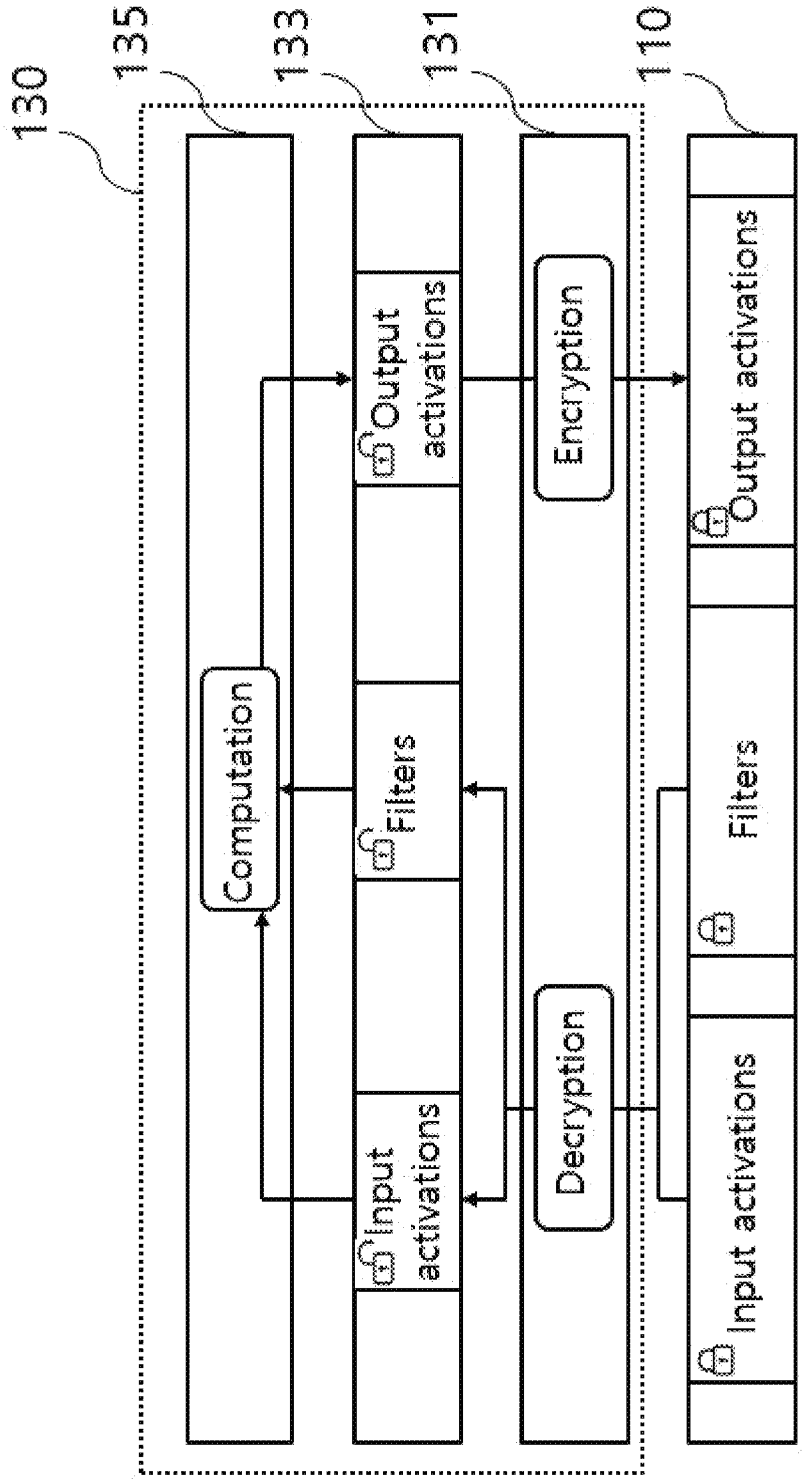
FIG. 1 is a diagram illustrating an artificial intelligence (AI) device based on a trust environment according to the present disclosure.

Description of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it also should be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms, such as “first” and “second,” etc., may be used to describe various components, such components have to not be understood as being limited to the above terms. For example, a first component may be named a second component and, similarly, the second component may also be named the first component.

It will be understood that when an element is referred to as being “connected to” another element, it may be directly connected to the other element or intervening elements may also be present. In contrast, when an element is referred to as being “directly connected to” another element, no intervening elements are present. In addition, unless explicitly described to the contrary, the word “comprise” and variations, such as “comprises” or “comprising,” will be understood to imply the inclusion of stated elements but not the exclusion of any other elements.

Meanwhile, other expressions describing relationships between components, such as “~ between”, “immediately ~ between” or “adjacent to ~” and “directly adjacent to ~” may be construed similarly.

Singular forms “a”, “an” and “the” in the present disclosure are intended to include the plural forms as well, unless the context clearly indicates otherwise. It will be further understood that terms, such as “including” or “having,” etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective operations are used for the sake of explanation and do not describe order of respective operations. The respective operations may be changed from a mentioned order unless specifically mentioned in context. Namely, respective operations may be performed in the same order as described, may be substantially simultaneously performed, or may be performed in reverse order.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a diagram illustrating an artificial intelligence (AI) device based on a trust environment according to the present disclosure.

Referring to FIG. 1, an artificial intelligence (AI) device 100 based on a trust environment is a framework for security enhancement and acceleration for execution of an artificial neural network in a mobile or embedded device, and may be implemented to include a first type memory 110 and a trust AI processing unit 130.

The first type memory 110 may transmit encrypted input data and receive encrypted output data. Here, the first type memory 110 may include dynamic random access memory (DRAM), but is not necessarily limited thereto.

The trust AI processing unit 130 may operate in a trust space and may perform AI computation of encrypted input and output data. To this end, the trust AI processing unit 130 may include a cryptographic processing front-end processor 131, a second type memory 133, and a processor 135.

The cryptographic processing front-end processor 131, as cryptographic hardware, may generate decrypted input data through decryption of encrypted input data and perform encryption of non-encrypted output data to generate encrypted output data. The cryptographic processing front-end processor 131 may receive an encryption input activation and an encryption filter as encrypted input data from the first type memory 110 and store a decryption input activation and decryption filter in the second type memory 133. The cryptographic processing front-end processor 131 may receive an on-demand request by the processor 135 in the process of AI computation and accesses the first type memory 110 to import encrypted input data.

The second type memory 133 may provide a buffer for the decrypted input data and the non-encrypted output data. Here, the second type memory 133 may have a faster operating speed and smaller storage capacity than the first type memory 110. For example, when the first type memory 110 includes DRAM, the second type memory 133 may include static random access memory (SRAM). When data is transmitted and received between the first and second type memories 110 and 133, the cryptographic front-end processor 131 may encrypt and decrypt the data to ensure accuracy and security.

The processor 135 may generate the non-encrypted output data by performing a neural network computation based on the decrypted input data. The processor 135 may directly perform a convolution-based neural network computation to reduce the number of accesses to the first type memory 110. That is, the processor 135 may directly minimize a working set size of a neural network computation by using convolution, and due to the reduced working set size, access to the first type memory 110, relativey slower than an operation speed of the second type memory 133, and calls for data encryption and decryption may be reduced, while performing the neural network computation.

The processor 135 may regularly store decryption input activations and store a decryption filter and a non-encryption output activation in the second type memory 133 in a circular queue manner. The processor 135 may efficiently manage the second type memory 133 based on an access pattern of input activations, filters, and output activations of a convolution layer in performing a neural network computation. The processor 135 may regularly store the input activations because the input activations tend to increase the reuse of the data, may store the filters in a circular queue manner because the filters are much smaller than the input activations in size and is required to generate only one output channel although the same filter is used multiple times when creating an output channel, and may store the output activation in the circular queue manner because the output activation is write-once data with high spatial locality.

The processor 135 may transmit/receive data to and from the first and second type memories 110 and 131 through interrupt-driven offloading of the cryptographic processing front-end processor 131. In addition, the processor 135 may transmit and receive data to and from the cryptographic processing front-end processor 131 and the first and second type memories 110 and 133 through direct memory access (DMA)-driven offloading of a DMA controller. The processor 135 may select among interrupt-driven offloading and DMA-driven offloading. Interrupt-driven offloading is suitable for performing latency-critical operations, while DMA-driven offloading is suitable for processing larger amounts of data at once. Here, the two offloading mechanisms may accelerate neural network computation.

The processor 135 may perform the neural network computation to overlap with the encryption and decryption operations performed by the cryptographic processing front-end processor 131 to implement intra-layer pipelining. The processor 135 allows the cryptographic processing front-end processor 131 to perform a decryption operation on the encrypted input data in the middle of performing the neural network computation, so that the neural network computation may be seamlessly performed. For intra-layer pipelining, the processor 135 may seamlessly perform neural network computation by subdividing into a data decryption step, a calculation step, and a data encryption step. The processor 135 may parallelize the data decryption step, the calculation step, and the data encryption step through intra-layer pipelining.

Figure 2:
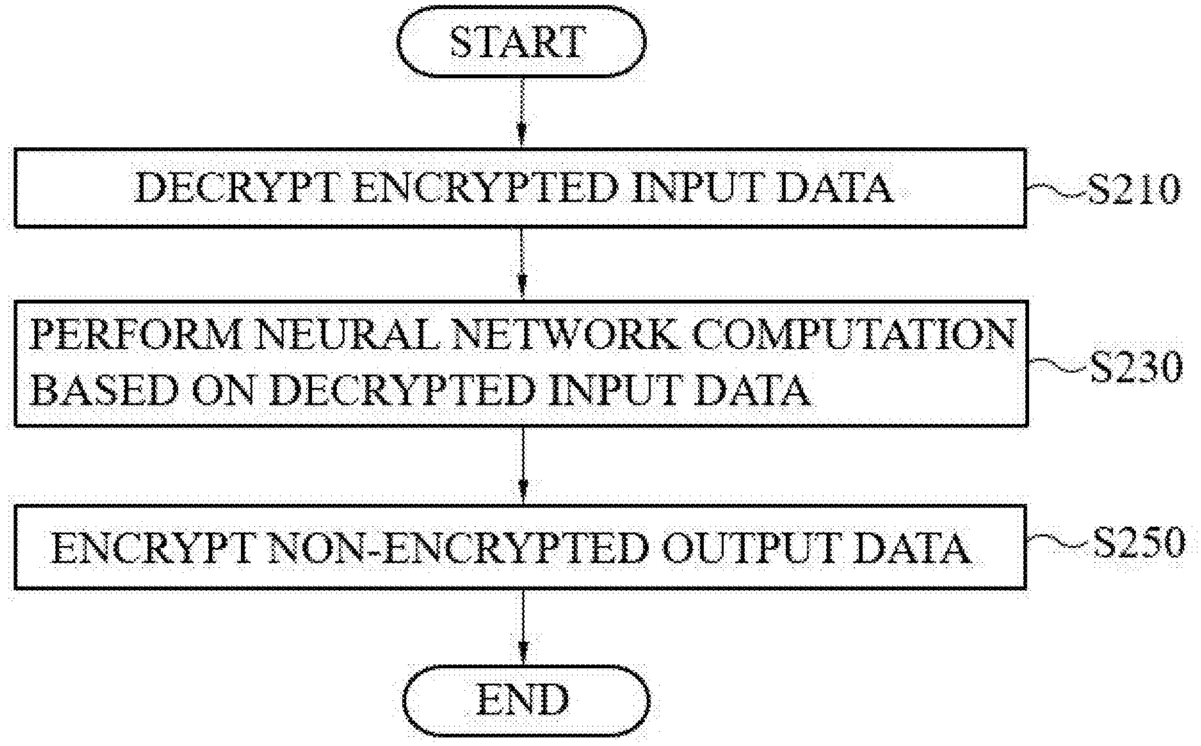
FIG. 2 is a flowchart illustrating a method of performing an AI computation based on a trust environment in the AI device of FIG. 1.

FIG. 2 is a flowchart illustrating a method of performing an AI computation based on a trust environment in the AI device of FIG. 1.

In FIG. 2, the AI device 100 may receive encrypted input data from the first type memory 110 and generates decrypted input data through decryption (step S210). The AI device 100 may perform decryption on the encrypted input data through the cryptographic processing front-end processor 131. The AI device 100 may store decrypted input data in the second type memory 133. The AI device 100 performs a neural network computation based on the decrypted input data to generate non-encrypted output data (step S230). Here, the AI device 100 may directly perform a convolution-based neural network computation through the processor 135, thereby reducing the number of accesses by the cryptographic processing front-end processor 131 to access the first type memory 110 and import the encrypted input data. The AI device 100 may store the non-encrypted output data in the second type memory 133.

The AI device 100 performs encryption on the non-encrypted output data to generate encrypted output data (step S250). The AI device 100 may perform encryption on the non-encrypted output data through the cryptographic processing front-end processor 310. The AI device 100 may output the encrypted output data to the first type memory 110.

The AI device 100 may perform the neural network computation of the processor 135 to overlap performing of the encryption and decryption operations of the cryptographic processing front-end processor 131 to implement intra-layer pipelining by a data decryption step, a calculation step, and a data encryption step, thereby accelerating the neural network computation.

Hereinafter, the AI device based on a trust environment according to the present disclosure will be described in detail with reference to FIGS. 3 to 17.

Figure 3:
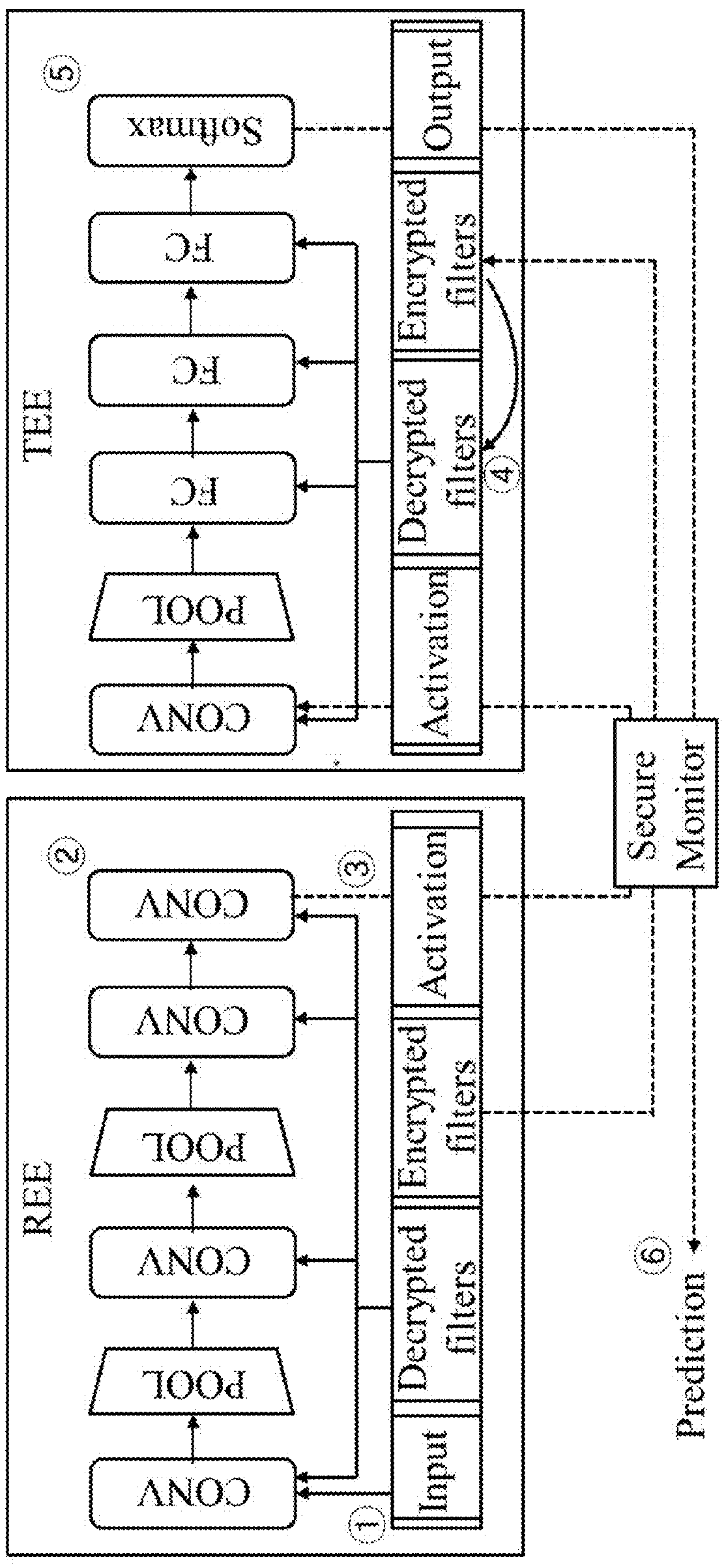
FIG. 3 is a diagram illustrating a trust execution environment.

FIG. 3 is a diagram illustrating a trust execution environment (TEE).

Referring to FIG. 3, the TEE is a secure processing environment having processing, memory, and storage functions and achieves high security by restricting sensitive operations and data from leaving a corresponding environment. Operations and data within the TEE may be isolated from an operating system (OS) and a rich execution environment (REE) in which applications are executed.

To implement a TrustZone-enabled TEE that may be used in mobile and embedded devices, TrustZone implements a secure processor mode allowing a CPU to operate exclusively on one of the TEE and REE at a given point in time. Transitions and interactions between the TEE and REE are managed by a secure monitor that may be called by secure monitor calls (SMC). In addition, TrustZone divides DRAM into secure and non-secure regions, and does not allow the REE to access the secure region to protect sensitive data in the TEE.

An existing DNN framework that runs in Trustzone-enabled TEEs (1) receive input data (e.g., a fingerprint image from a fingerprint sensor) from a peripheral device and start in REE. 2 After executing some initial layers of the DNN in the REE, 3 the DNN framework encrypts an output activation and transmit the same to the TEE through the SMC. Thereafter, the DNN framework 4) decrypts an activation transmitted within the TEE, and 5 executes the remaining layers using the decrypted activation and a pre-transmitted filter. When the execution of the remaining layers is completed, the DNN framework 6 returns prediction made by the DNN to the REE through the SMC.

In this manner, the execution of the DNN may be isolated and may be protected from several security attacks.

Figure 4A:
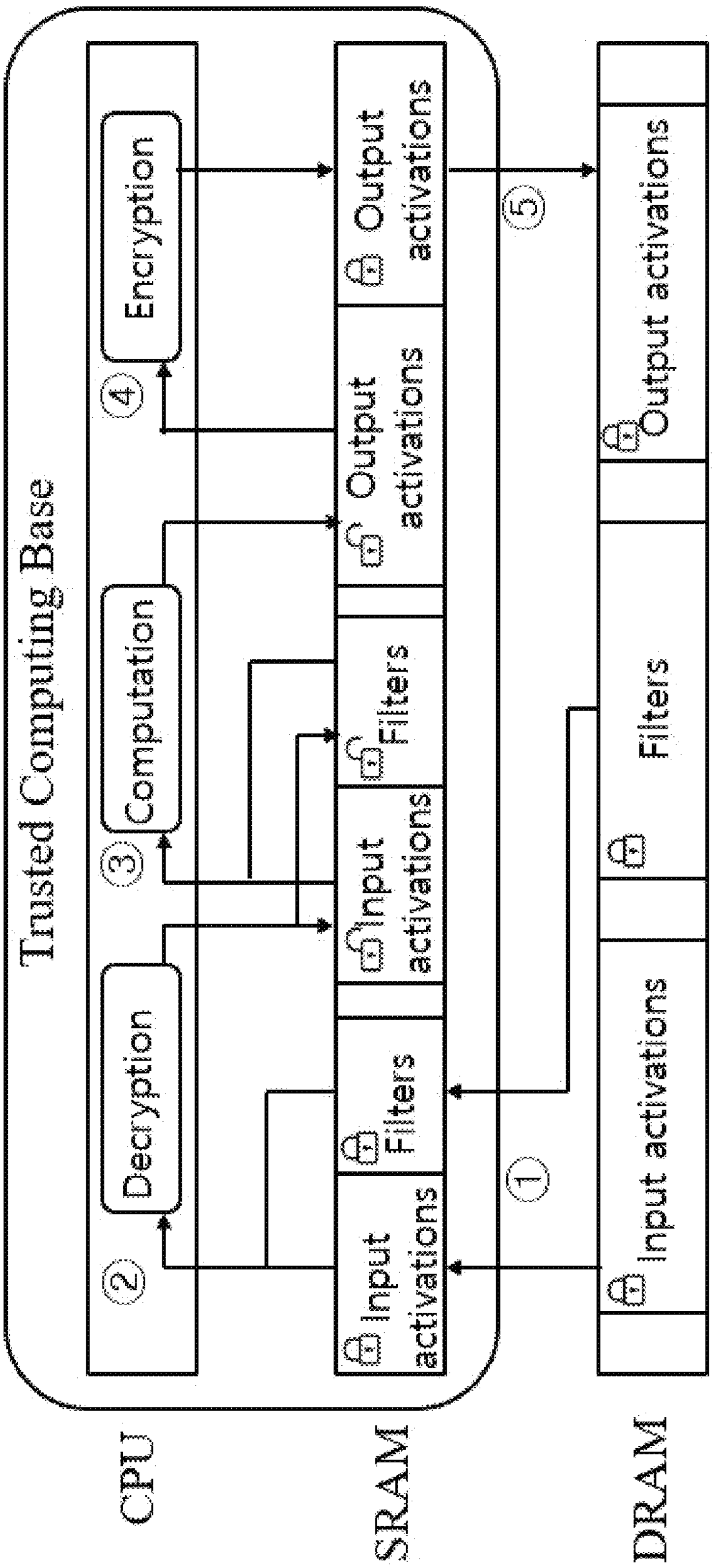
FIGS. 4A and 4B are diagrams illustrating a working model of the DNN framework according to the present disclosure compared to the existing one.
Figure 4B:
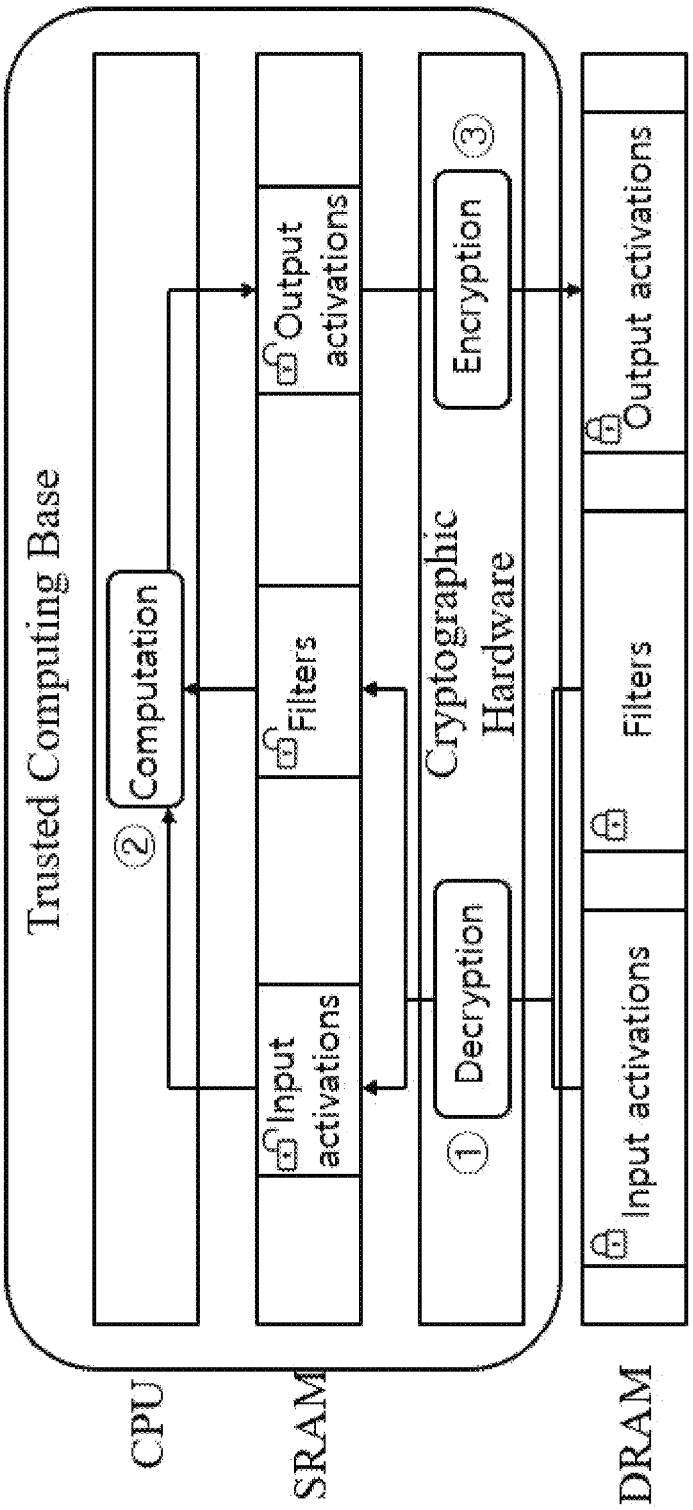

FIGS. 4A and 4B are views illustrating a working model of a DNN framework according to the present disclosure compared to the existing one. FIG. 4A is the existing DNN framework, and FIG. 4B is a DNN framework proposed by the present disclosure (hereinafter referred to as GuardianNN).

In the case of an existing DNN framework of FIG. 4A, first, both input data and filters of a DNN are encrypted and stored in DRAM. When starting executing of the layers of the DNN, the framework ① loads the encrypted input activations and filter into SRAM and ② decrypts the data using the CPU. Thereafter, the framework ③ executes each layer using the decrypted data and stores an output activation in SRAM. The framework then ④ encrypts the output activation and ⑤ stores the same in DRAM. The input activation and filter are replaced with the SRAM as needed. If the SRAM is smaller than a working set of the layers, data swapping and encryption/decryption will occur frequently. An existing DNN framework may fully protect sensitive users and DNN data from security attacks by using the encrypted DRAM and executing the DNN inside the TEE but they may suffer from slow DNN execution.

Figure 5:
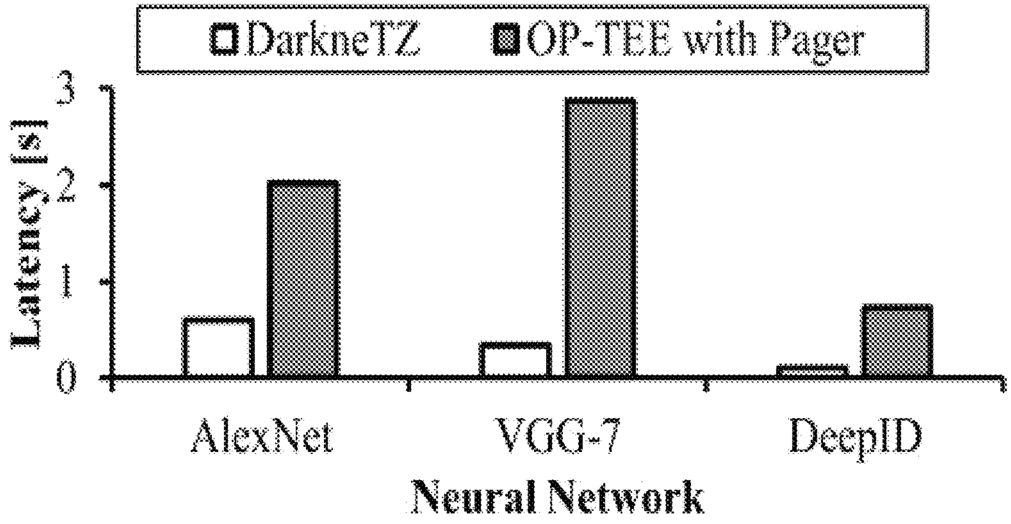
FIGS. 5 to 7 are diagrams illustrating an execution speed, bandwidth, and decrypting throughput of existing DNN frameworks, respectively.
Figure 6:
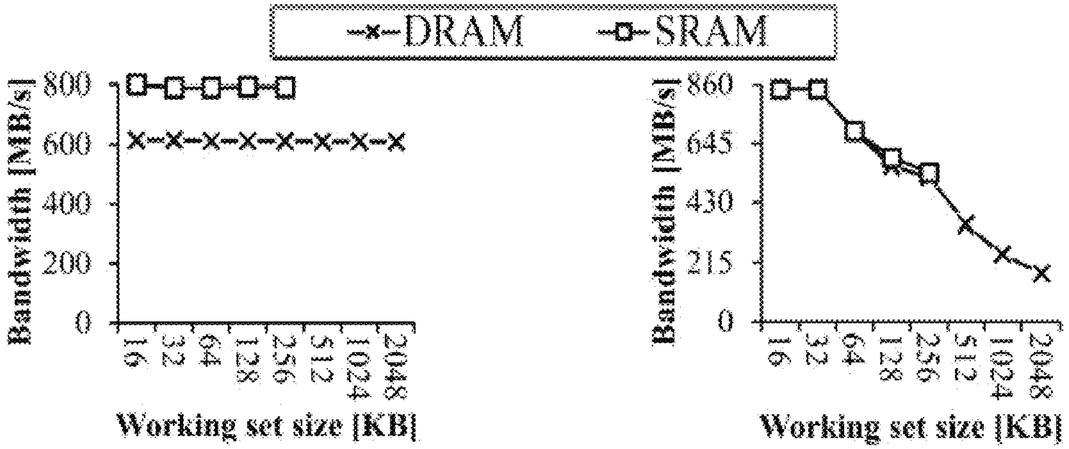
Figure 7:
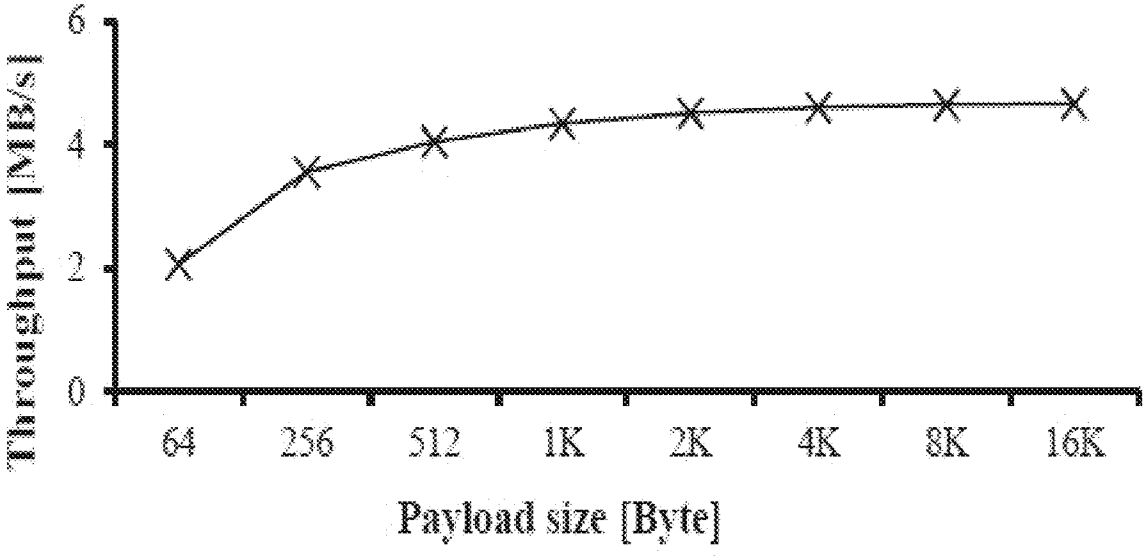

FIGS. 5 to 7 are diagrams illustrating an execution speed, a bandwidth, and decrypting throughput of the existing DNN framework, respectively.

As shown in FIG. 5, a result of comparing the DNN execution speed of the existing DNN framework (OP-TEE with Pager) of FIG. 4A and that of an unsafe DarkneTZ working model that does not encrypt DRAM data shows that the DNN execution speed of the existing DNN frameworks was noticeably slower than that of DarkneTZ. The existing DNN framework took 3.42$x$ longer to execute AlexNet than DarkneTZ.

As for the existing DNN framework, the number of slow DRAM accesses may increase due to the limited capacity of embedded SRAM and a performance bottleneck phenomenon due to high data encryption and decryption overhead imposed on the CPU may affect the DNN execution speed.

Specifically, the existing DNN framework utilizes embedded SRAM as a secure on-chip memory in which the TEE may safely load encrypted DRAM data and decrypt the loaded data. However, since the capacity (hundreds of kilobytes) of SRAM is typically smaller than an on-chip CPU cache (hundreds of kilobytes) of mobile and embedded devices, SRAM is used as a secure on-chip buffer. A size of the effective on-chip memory is reduced by one digit. This increases the number of slow DRAM accesses when executing the DNN, which slows down the DNN execution speed.

As shown in FIG. 6, results of comparing the bandwidths of secure embedded SRAM and off-chip DRAM for various working set sizes showed that SRAM consistently provides higher bandwidth than DRAM for various working set sizes. This means increased DRAM access negatively affects a DNN execution speed. The results also suggest that sequential access should be preferred over random access to achieve higher bandwidth. As a result, to minimize the negative impact of slow DRAM accesses on the DNN execution speed, the reuse of fast SRAM data should be maximized and memory accesses in DNN executions should be configured as sequential accesses.

When exchanging data between embedded SRAM and encrypted DRAM, data should be encrypted and decrypted by the CPU to ensure functional correctness and high security. However, CPU-based encryption/decryption is not only slow, but also consumes a large portion of the limited CPU bandwidth, so the limited CPU bandwidth is shared by both the computationally intensive DNN execution and encryption and decryption, which slows down the DNN execution.

As shown in FIG. 7, the CPU-based data decryption throughput with various payload sizes indicates that data encryption and decryption suffer from limited CPU resources and a throughput of 4.51 MB/s is achieved with a 2 KB payload. Compared to the throughput (609.24 MB/s, FIG. 6 (*a*)) of sequentially accessing 2 KB of DRAM data, CPU-based 2 KB data encryption and decryption is 135.09 times slower than sequential DRAM access. Low data encryption and decryption throughput indicates that overhead of data encryption and decryption is significant, making it difficult for the existing DNN framework to achieve fast DNN execution. As a result, the existing DNN framework significantly suffers from high DRAM data encryption and decryption overhead imposed on limited CPU resources, and the overhead should be addressed for fast and secure DNN execution.

Accordingly, the present disclosure proposes GuardiaNN, a fast and secure DNN framework for mobile and embedded devices, by solving the slow DNN execution problem of the existing DNN framework. The GuardiaNN proposed in the present disclosure has the following characteristics.

The working set size of a DNN execution may be minimized through direct convolution. By reducing the working set size, slow DRAM accesses and data encryption and decryption requests may be reduced during DNN execution.

Data reuse in convolutional layers may be maximized by using DNN-friendly SRAM management. SRAM may be efficiently managed by fixing input activations to SRAM and storing filters and output activations in a circular queue.

Data encryption and decryption may be offloaded to cryptographic hardware. When offloading data encryption and decryption, limited CPU resources may be used to be DNN exclusively.

DNN execution may be further accelerated by overlapping the DNN layer and data encryption and decryption operations. This is possible because the CPU and cryptographic hardware may simultaneously perform the DNN and data encryption and decryption operations, respectively.

Referring to FIG. 4B, the working model of the DNN framework proposed in the present disclosure, when executing the DNN layer, 1) loads the input activation and filter encrypted in the DRAM from the cryptographic hardware (the cryptographic front-end processor in FIG. 1) usable in mobile and embedded devices, decrypts data, and stores the decrypted data in SRAM. Thereafter, 2 the CPU (the processor in FIG. 1) performs the operation of the DNN layer using the SRAM data and stores the output activation in SRAM (the second type memory in FIG. 1). Thereafter ③ the cryptographic hardware encrypts the output activation stored in SRAM and stores the encrypted output activation in DRAM (the first type memory in FIG. 1).

Compared to the working model of the existing DNN framework in FIG. 4A, high data encryption and decryption overhead imposed on the CPU may be significantly reduced by using slow DRAM access and cryptographic hardware by using direct convolution and DNN-friendly SRAM management. The influence of the main features proposed in the present disclosure on DNN execution may be summarized in Table 1 below.

TABLE 1

| Key Idea | Beneficial to DNNs Having |
|---|---|
| Direct Convolutions | Large filter sizes, high input channel counts, small stride sizes |
| DNN-Friendly SRAM Mgmt. | High output channel counts |
| Cryptographic Hardware | Large memory footprint sizes |
| Intra-Layer Pipelining | Balanced compute & encryption/decryption |

The present disclosure may significantly reduce slow DRAM access during DNN execution by reducing the working set size of the convolution layer by using direct convolution and maximizing reuse of SRAM data by using DNN-friendly SRAM management.

Figure 8A:
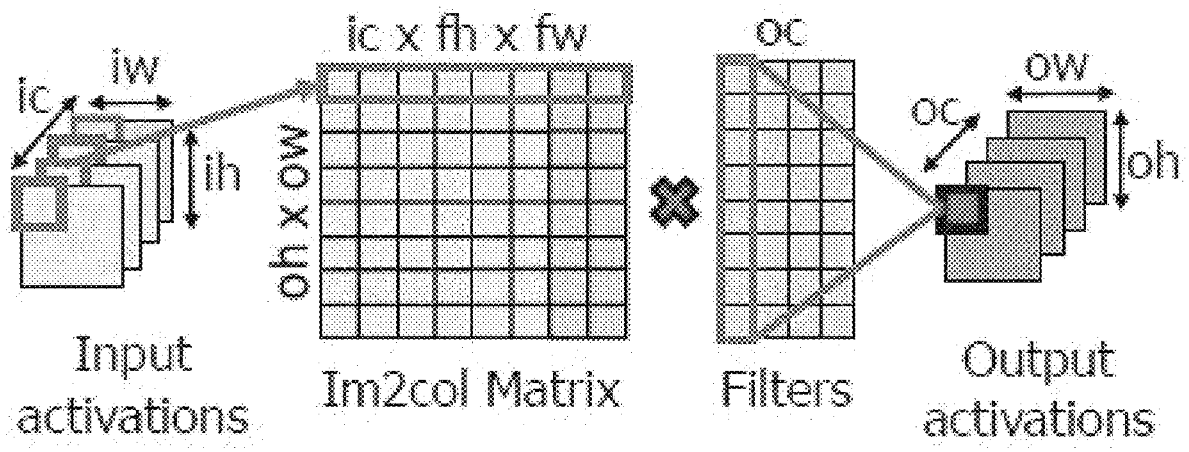
FIGS. 8A and 8B are diagrams illustrating convolution used to perform neural network computations.
Figure 8B:
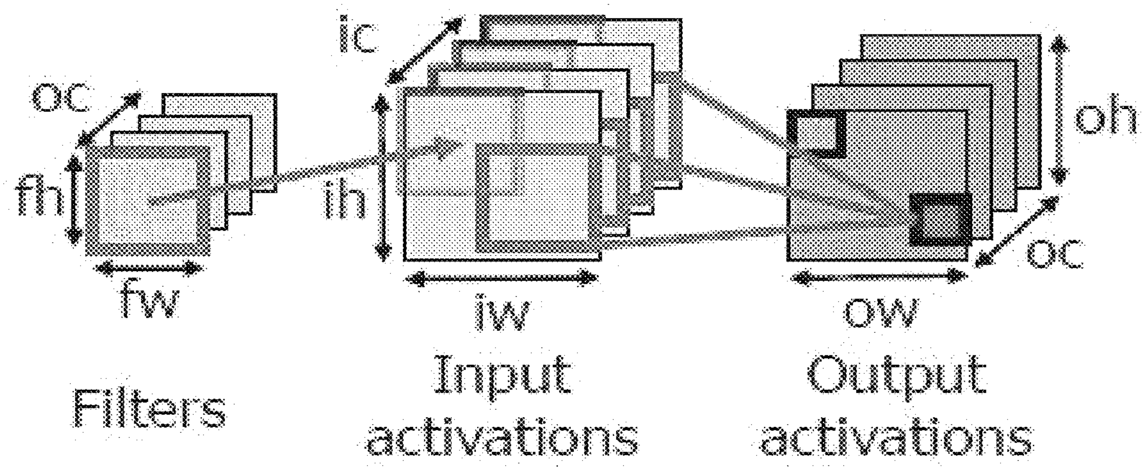

FIGS. 8A and 8B are diagrams illustrating convolution used to perform a neural network computation. FIG. 8A is im2col (Image to Column) convolution, and FIG. 8B is direct convolution.

The existing mobile and embedded DNN framework (e.g. DarkneTZ, TensorFlow Lite) performs time-consuming convolutional layers using im2col (Image to Column) convolution. Im2col refers to a function that converts multi-dimensional data into a matrix to perform matrix operations. The convolution of multi-dimensional data is equal to the dot product of data converted to a matrix through im2col. Im2col convolution may achieve fast convolutional layer execution by flattening each patch (i.e., a set of input activations whose elements are mapped to elements of a filter) into a two-dimensional matrix and performing matrix multiplication between the flattened patch and the filter, as shown in FIG. 8A. However, merging patches significantly increases the working set size of the convolutional layer because additional buffers should be allocated to store the merged patches. The increase in the working set size due to the limited capacity (up to hundreds of KB) of SRAM may result in many slow DRAM accesses that significantly slow down the DNN execution. Therefore, the working set size of the convolutional layer should be minimized to achieve fast DNN execution.

In order to minimize the working set size of the convolution layer, direct convolution may be used instead of im2col convolution in the present disclosure. In direct convolution, the filter of the convolution layer is correlated with the input, and results of calculating correlation values in all regions using a sliding window method are output. Direct convolution does not increase the working set size because the necessary input activations are imported on demand, as shown in FIG. 8B. In addition to reduced working set size, direct convolution tends to increase reuse of SRAM data due to the inherent temporal and spatial locality of the input activations. Because direct convolution creates channels of output activations by spatially sliding the filter across the input activations, input activations adjacent to recently accessed input activations are likely to be accessed in the near future. In the case of the filter, since the same filter is used multiple times when generating an output channel, the filter has high temporal locality. The high spatial and temporal locality of direct convolution combined with demand-paging embedded SRAM may help significantly reduce slow DRAM accesses.

Figure 9A:
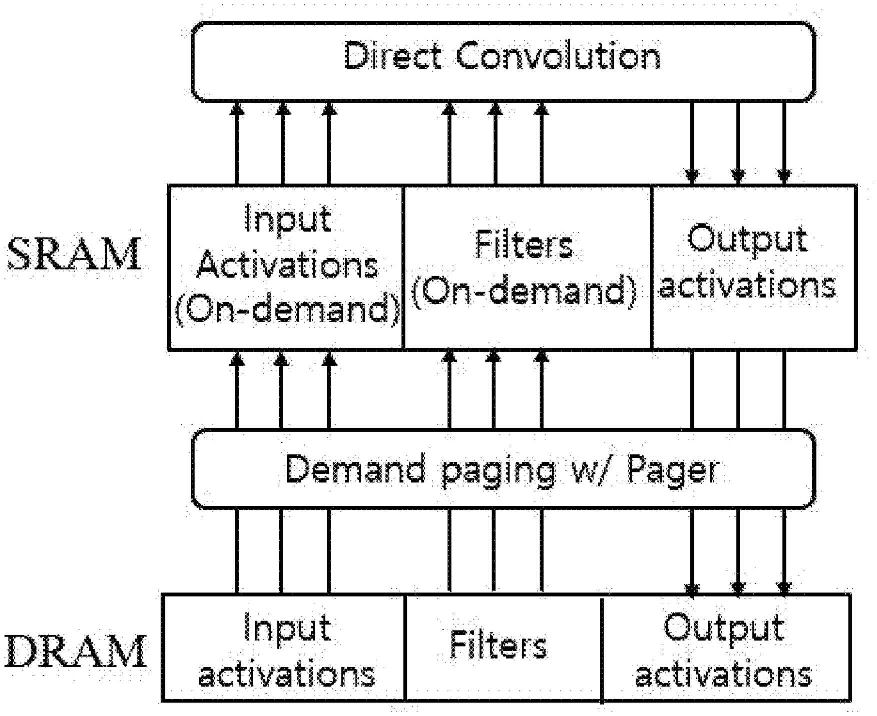
FIGS. 9A and 9B are diagrams illustrating a DNN-friendly SRAM management process.
Figure 9B:
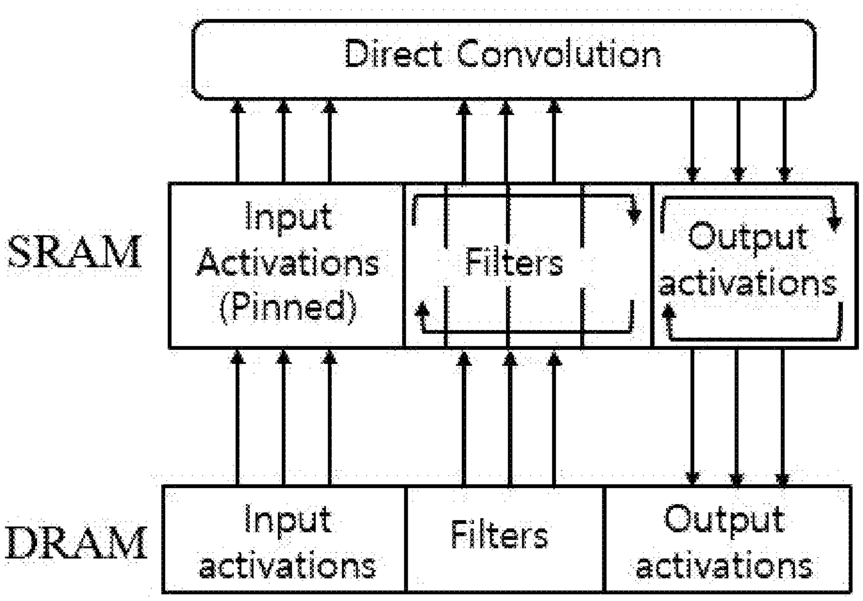
Figure 10:
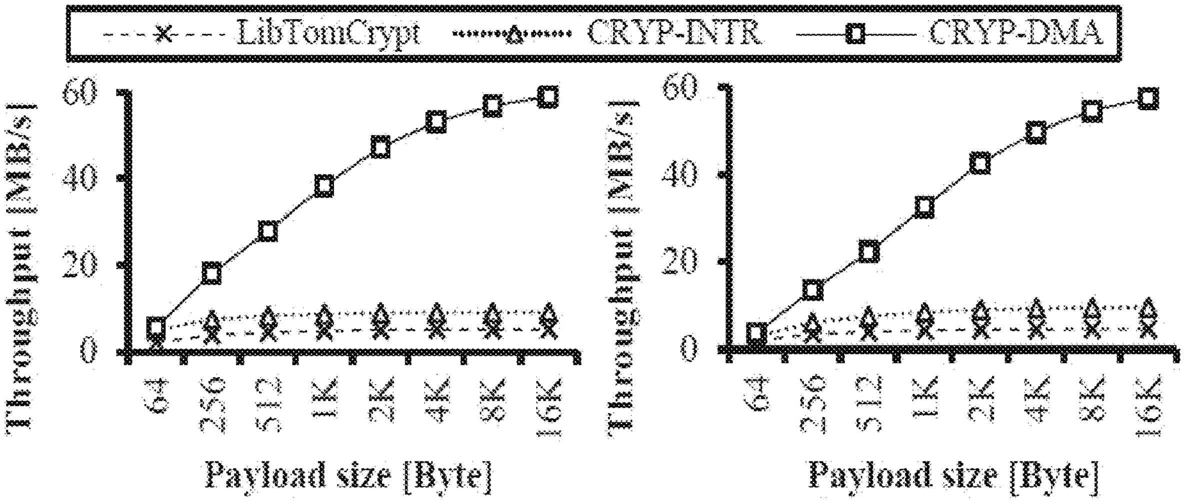
FIG. 10 is a diagram illustrating throughput between a CPU and cryptographic hardware.

FIGS. 9A and 9B are diagrams illustrating a DNN-friendly SRAM management process. As shown in FIG. 9A, Pager, which is a framework of an existing open source TEE to which ARM TrustZone technology is applied, manages limited capacity of secure embedded SRAM using uses demand paging. Demand paging reclaims SRAM space by loading data from encrypted DRAM into SRAM as needed and pushing the most recently unused SRAM data into DRAM. Demand paging effectively utilizes the temporal locality of data, but does not recognize various access patterns of input activations, filters, and output activations of the convolutional layers. Also, since the size of SRAM is only a few hundred kilobytes in the mobile and embedded devices, not all the data needed for the convolutional layers may be stored in SRAM. Such inefficient SRAM management significantly increases the number of slow DRAM accesses and hinders fast DNN execution. Therefore, it is necessary to efficiently manage small SRAM by integrating various data access patterns of the convolutional layer so that the SRAM does not cause a large amount of slow DRAM accesses.

As shown in FIG. 9B, the present disclosure may implement DNN-friendly SRAM management to maximize reuse of SRAM data. Here, DNN-friendly SRAM management utilizes various access patterns of input activations, filters, and output activations of the convolutional layer. The present disclosure first locks all input activations to SRAM when accessing iteratively throughout the convolutional layer execution. Input activations accessed to create output channels should be accessed again for all other output channels. Then, the remaining SRAM space is organized into two circular queues. One is for filters and the other for output activations. Filters are frequently accessed data, like the input activations. However, since the size of the filters is much smaller than that of the input activations and the filters are required to generate only one output channel, a high temporal locality may be fully utilized simply by storing the filters in a circular queue. Output activations are write-once data with high spatial locality, so they are suitable for circular queues. By managing SRAM in a DNN-friendly manner, reuse of SRAM data may be maximized and DNN execution may be accelerated by minimizing slow DRAM accesses.

In the present disclosure, data encryption and decryption may be performed using cryptographic hardware, so that limited CPU resources may be fully used for DNN execution. By doing so, it is possible to fully dedicate CPU resources to the DNN execution as well as utilize the high performance of the cryptographic hardware to achieve fast DNN execution. Data encryption and decryption take place whenever SRAM loads and stores data from encrypted DRAM and consumes a significant amount of limited CPU resources. To overcome high overhead of data encryption and decryption, encryption and decryption operations may be performed using cryptographic hardware. By offloading data encryption and decryption with high overhead to the cryptographic hardware, limited CPU resources may be fully dedicated and DNN execution may be accelerated (refer to FIG. 10).

Figure 11:
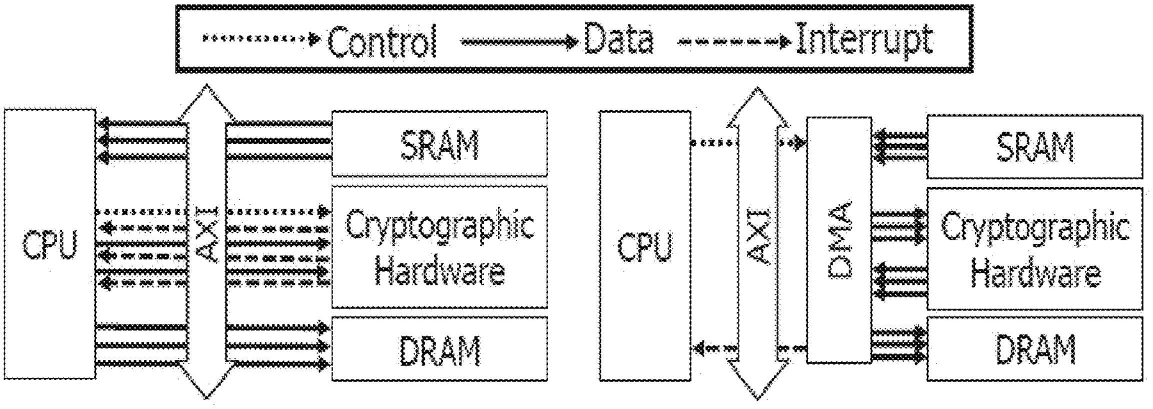
FIG. 11 is a diagram illustrating offloading of cryptographic hardware.

FIG. 11 is a diagram illustrating offloading of cryptographic hardware, in which (a) is interrupt-driven offloading and (b) is direct memory access (DMA)-driven offloading.

The present disclosure may select from two hardware offloading mechanisms of FIG. 11: (a) interrupt-driven offloading and (b) DMA-driven offloading. Both offloading mechanisms may be accelerated in different peripheral usage scenarios. Interrupt-driven offloading generates an interrupt as soon as a peripheral device finishes processing a given task, and thus, is suitable for performing latency-critical tasks in the peripheral device. Meanwhile, DMA-driven offloading is suitable for processing larger amounts of data at one time. DMA processes all data transmissions and peripheral calls to process data without CPU intervention, and generates an interrupt after all data are processed. DNN-friendly SRAM management requires large data transmission (generally tens of kilobytes) between SRAM and DRAM, so DMA-driven offloading, which achieves higher throughput with a larger payload size, may be advantageous, compared to interrupt-driven offloading.

Cryptographic hardware may accelerate DNN execution by fully dedicating limited CPU resources to DNN execution, allowing for additional performance optimization. A redundant DNN execution and data encryption and decryption are executed in the CPU and cryptographic hardware, respectively. One property of the convolutional layer is that the operations of generating different output channels are independent of each other. The convolutional layer generates one output channel using one filter, and input activations are shared as read-only data among all output channels. This property is also applied to a pooling layer. Each output channel of the pooling layer requires only a corresponding input channel, making the take of the output channel in parallel. Based on this, the execution of the large output channels of the convolution layer may be divided into three pipeline steps: data decryption step, calculation step, and data encryption step. Thereafter, three steps of different bulks of the output channel may be pipelined to achieve faster DNN execution. This is called intra-layer pipelining. This is because various output channel operations of the convolution layer are connected by a pipeline.

Figure 12:
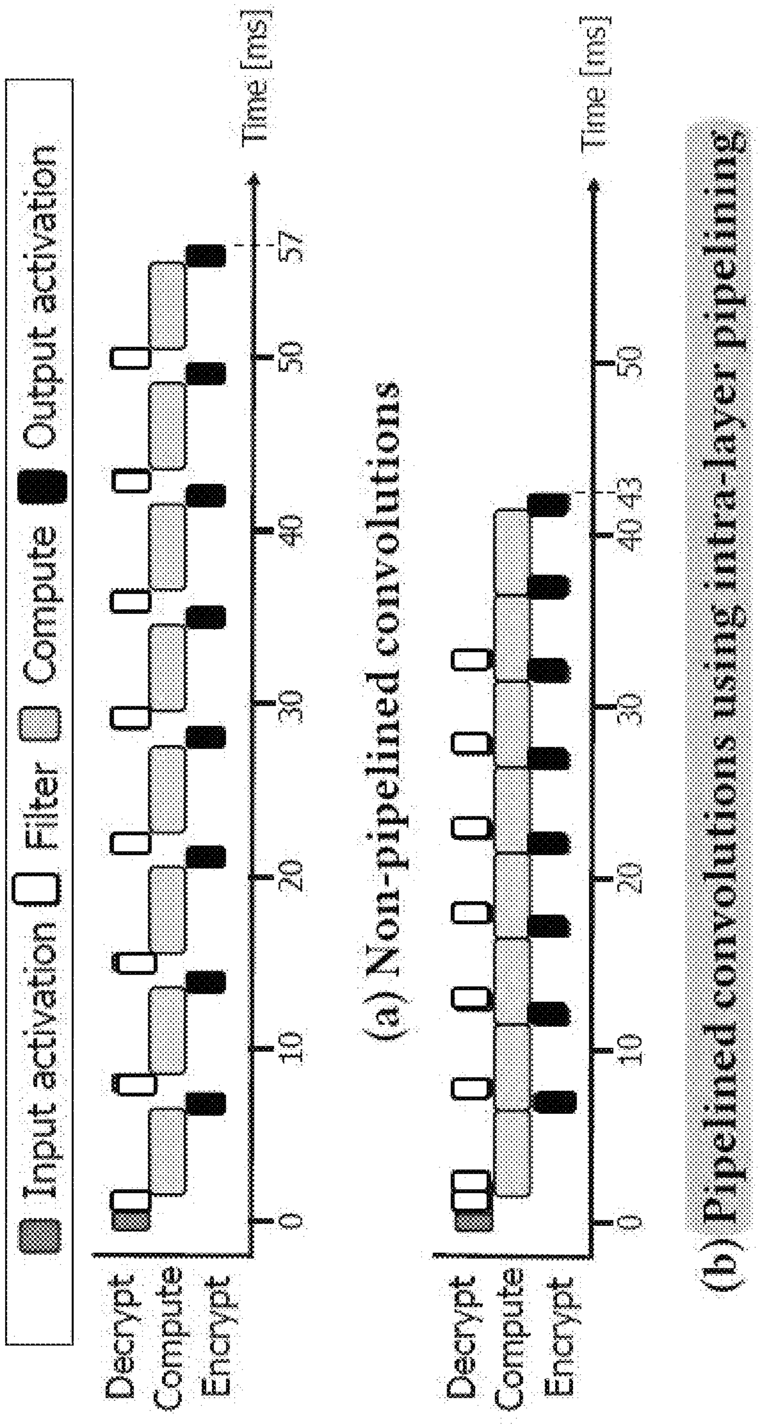

FIG. 12 is a diagram illustrating implementation of intra-layer pipelining in the process of performing neural network computation, illustrating advantages when 256 output channels (including a large amount of 32 output channels due to the limited capacity of SRAM) are generated and intra-layer pipelining is applied to a 6-th layer of AlexNet, which contributes the most to execution latency of AlexNet.

In FIG. 12, in the data decryption step, input activations and/or filters required to generate a large amount of output channels are decrypted and loaded to SRAM. Thereafter, in the calculation step, a large amount of output channels are calculated using input activations and filters.

Thereafter, in the data encryption step, the large amount of output channels are encrypted and stored in DRAM. Without intra-layer pipelining, three steps are serialized as in (a) and it takes 57 ms to execute the layer. Meanwhile, intra-layer pipelining, which pipelines 3 steps of different bulks of output channels, three steps are parallized as in (b) and it takes only 43 ms to execute the layer, which is 24.6% faster than the case (a). This example shows that intra-layer pipelining may achieve faster DNN execution. FIG. 13 is an algorithm illustrating pseudocode for applying intra-layer pipelining to a convolutional layer.

However, applying intra-layer pipelining to convolutional layers consumes more SRAM than layer execution without using pipeline. Larger capacity is required to ensure functional accuracy of intra-layer pipelining. In order to overlap the calculation step of the large amount of output channels and the data decryption step of the next large amount of output channels, SRAM buffers for two large amounts should be allocated at the same time. If larger SRAM buffers are required, the output channels of the layer are grouped into a larger number of bulks, which may slow down DNN execution. However, despite the need for larger SRAM buffers, the performance benefits of intra-layer pipelining may outweigh the potential performance degradation from fewer output channels per bulk. Therefore, basically, intra-layer pipelining for convolutional and pooling layers is activated. However, for mobile and embedded devices with very small embedded SRAM, intra-layer pipelining may be deactivated to avoid potential performance degradation.

Figure 14:
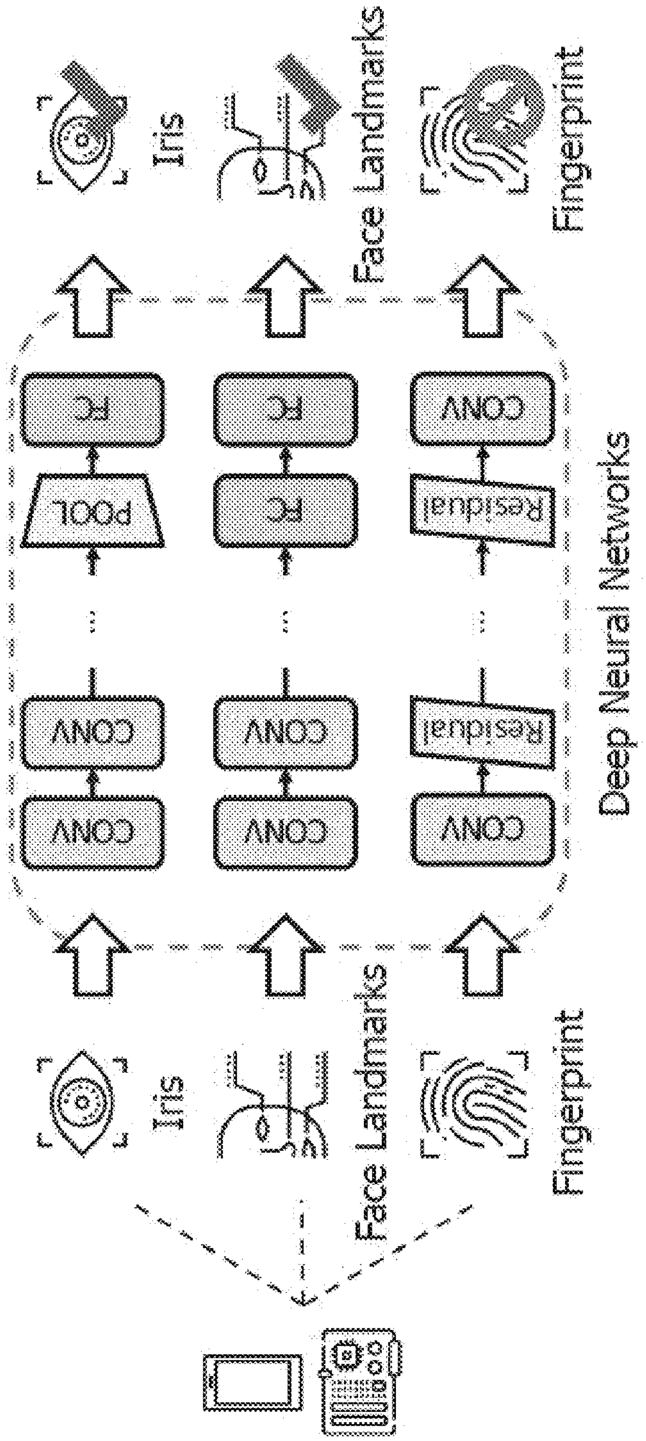
FIG. 14 is a diagram illustrating an example of a software configuration of the present disclosure.

FIG. 14 is a diagram illustrating an example of a software configuration required to implement the present disclosure on mobile and embedded devices equipped with secure embedded SRAM and cryptographic hardware.

In FIG. 14, the present disclosure is implemented on OP-TEE, an open source TrustZone-based implementation, which is one of the most widely used TEE implementations, but the present disclosure is not necessarily limited thereto and may be implemented on any TrustZone-based TEE implementation. At the heart of the present disclosure is the GuardiaNN runtime, a trusted application that executes layers of a DNN to generate predictions for a given input within a TEE. The execution of DNN starts from the REE. First, the REE transfers the description (e.g., the number of layers, the size of input and output activations per layer), cryptographic input data, and filters of the DNN to the TEE memory and invokes the GuardiaNN runtime. The GuardiaNN runtime then executes each layer of the DNN using helper functions that implement different types of DNN layers. The GuardiaNN runtime then returns the predictions made by executing the DNN back to the REE.

Direct convolution may only be implemented only within the GuardiaNN runtime, and should interact with an OS (e.g. OP-TEE) trusted by the GuardianNN runtime to allocate SRAM and use cryptographic hardware and DMA. To implement DNN-friendly SRAM management and intra-layer pipelining, the GuardiaNN runtime should allocate buffers that are not swapped out for DRAM in SRAM. To this end, TEE_Malloc ( ) a TEE Internal Core API function for TEE memory allocation, is extended to use an additional input argument called isSRAM. If the value of isSRAM is true, the trusted OS allocates an SRAM buffer and prevents the buffer from being swapped out to DRAM. The memory manager of the trusted OS (e.g. Pager) is extended to prevent swapping allocated SRAM buffers by calling TEE_Malloc ( ) with isSRAM set to true for DRAM. The default value of isSRAM is set to false to ensure functional accuracy for existing trusted applications that is not aware of isSRAM. For example, when TEE_Malloc (1024, hint, true) is called, a 1 KB non-removable SRAM buffer is allocated to DRAM. The hints here give some hints about the nature of the buffer (e.g. Fill it with 0).

For DMA-driven data encryption and decryption offloading, the GuardiaNN runtime invokes a custom system call defined by a DMA device driver of the the trusted OS. The GuardiaNN implementation extends Trusted OS to provide two custom system calls, EncryptData ( ) and DecryptData ( ) The EncryptData ( ) system call takes as input the encryption context (including encryption type, key size, etc.), SRAM start address, DRAM start address, and data size. The system call then flushes the CPU cache to remove dirty cache lines to SRAM, reads the unencrypted SRAM data from the SRAM start address, encrypts the data using the encryption context and cryptographic hardware, and stores the encrypted data to DRAM at DRAM start address. In a similar manner, the DecryptData ( ) system call takes as input four arguments: cryptographic context, DRAM starting address, SRAM starting address, and data size. Then, following a procedure similar to the EncryptData ( ) system call, the encrypted DRAM data is read, the data is decrypted, and the decrypted data is stored in SRAM.

Using two custom system calls along with the extended TEE_Malloc ( ) API function and the existing GlobalPlatform API, the present disclosure may be faithfully implemented on mobile and embedded devices.

EVALUATION

Experimental Setup

To evaluate the effectiveness of GuardiaNN on fast and secure DNN execution, GuardiaNN was prototyped on top of the STM32MP157C-DK2 development board and the DNN execution speed and energy consumption were compared with a basic secure DNN framework. The development board is officially supported by OP-TEE, an open-source TrustZone-based TEE implementation, and reflects the typical hardware configuration of modern embedded devices. It includes a dual-core ARM Cortex-A7 CPU, 256 KB secure embedded SRAM, cryptographic hardware and 512 MB DDR3L DRAM. As a trusted OS, OP-TEE v3.11.0 is used together with Pager supporting GlobalPlatform TEE Client API v1.1 and Internal Core API v1.0.

Implementation of GuardiaNN and the basic framework use only one CPU core because OP-TEE currently does not support multithreading within a single TEE instance. The implementation of DNN layer of DarkneTZ with ARM NEON single instruction multiple data instructions is extended to take advantage of data parallelism between each DNN layer tasks. The extended DNN layer implementation is applied to both GuardiaNN and the base framework. It is assumed that the trusted OS allocates all SRAM (except for the 4 KB reserved by OP-TEE as shared memory between the TEE and the REE) to both GuardiaNN and the basic framework. For energy consumption comparison, a Monsoon HVPM (High Voltage Power Monitor) is used and the energy consumption of the entire unit is measured.

As benchmarks, eight quantized DNNs were selected using 8-bit integer quantization and five representative mobile and embedded application domains related to sensitive user and DNN data are handled. The five domains are image classification, face recognition, fingerprint recognition, eye tracking and emotion recognition. There are various DNNs for each domain. However, a representative lightweight DNN is selected in each domain with a reasonably short execution latency to execute here. For example, on the STM32MP157C-DK2 development board, ResNet-18, a DNN for image classification, is not included as a benchmark because the basic framework took 192 seconds to execute the DNN. Table 2 below lists eight DNNs and characteristics thereof.

TABLE 2

| Domain | Name | # Layers | Input Size |
|---|---|---|---|
| Image classification | AlexNet [35] | 11 | 3 × 32 × 32 |
| | MobileNetV1 [25] | 29 | 8 × 32 × 32 |
| | Tiny Darknet [63] | 21 | 3 × 32 × 32 |
| | VGG-7 [37] | 11 | 3 × 32 × 32 |
| Face recognition | DeepID [69] | 9 | 3 × 31 × 31 |
| Fingerprint recognition | FgptAuth [66] | 11 | 1 × 128 × 128 |
| Gaze tracking | GAZEL [58] | 10 | 1 × 64 × 64 |
| Emotion recognition | Smart Doll [11] | 11 | 3 × 50 × 50 |

Fast DNN Execution

First, the DNN execution speed of GuardiaNN is evaluated by measuring execution latency of all selected DNNs. To analyze the contribution of the proposed techniques, the DNN execution latency is measured by gradually applying each proposed technique, starting from the basic framework. Working on direct convolution and DNN-friendly SRAM management, cryptographic hardware, and intra-layer pipelines provides a total of 5 configurations indicated by the 5 bars in FIG. 15. In the experiments, a bulk size of 8 output channels is used for intra-layer pipelining.

Figure 15:
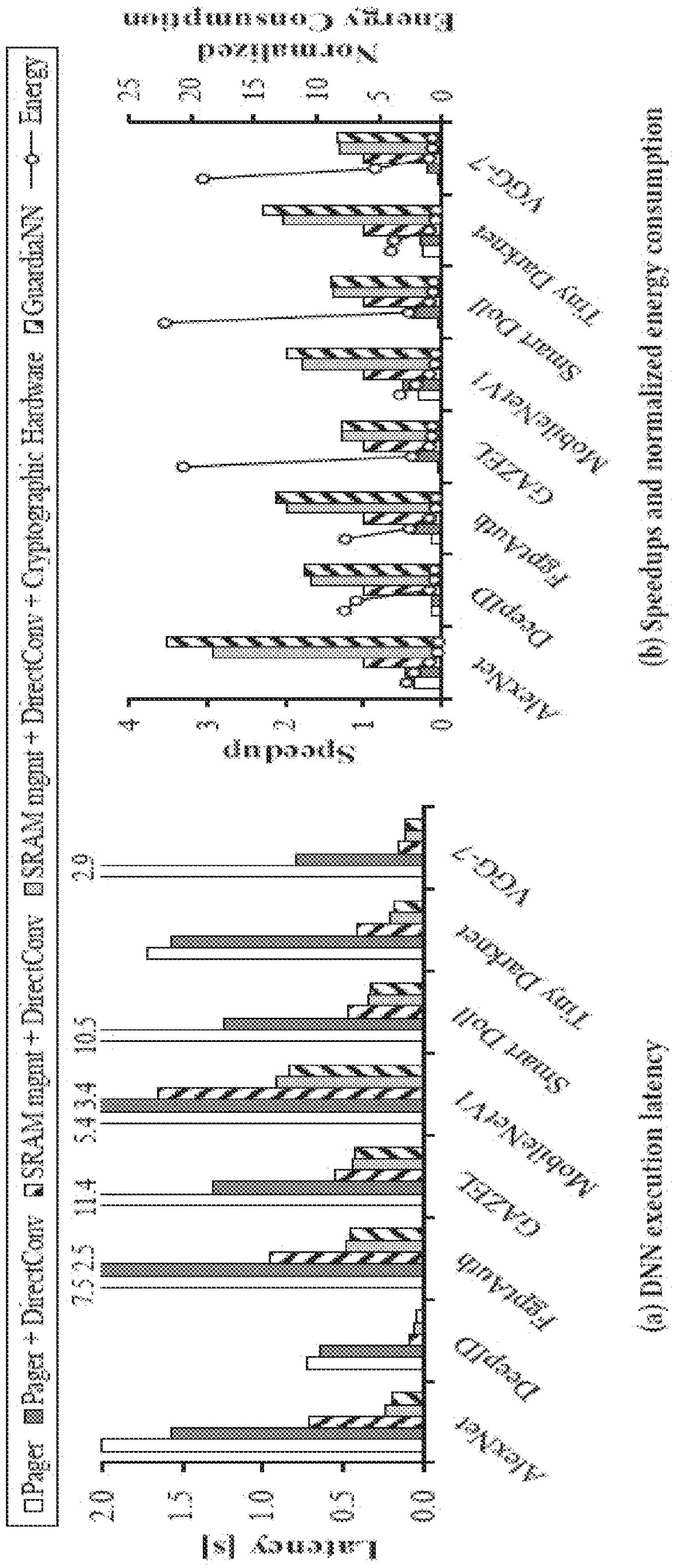
FIGS. 15 to 17 are diagrams illustrating experimental results according to the present disclosure.

(a) of FIG. 15 illustrates a test result of waiting time. Most DNN executions are excessively slow on the basic framework, resulting in latency of up to 11.4 seconds. GuardiaNN reduces latency to less than 1 second for all DNNs. (b) of FIG. 15 illustrates a relative speedup provided by the normalized GuardiaNN with a configuration in which direct convolution and a DNN-friendly SRAM management technique (a third bar) are applied. It can be observed that each proposed technique is effective. Applying direct convolution improves a geometric mean speedup of 2.58*x* compared to the basic framework using im2col. DNN-friendly SRAM management yields an additional geometric mean speedup of 3.19 times. Offloading encryption and decryption to cryptographic hardware provides an additional geometric mean speedup of 1.73 times. Applying intra-layer pipelining may improve this even further, increasing the geometric mean speed by 1.07 times. GuardiaNN achieves a geometric mean speedup of 15.3 times over baseline. Of the eight DNNs evaluated here, GuardiaNN accelerates Smart Doll the most, making it 31.4 times faster than the baseline. Most of this speedup is due to a reduction in the number of slow DRAM accesses as a result of applying DNN-friendly SRAM management together with direct convolution. AlexNet benefits most from the use of the cryptographic hardware of GuardiaNN and intra-layer pipelines. Compared to layer operations, encryption and decryption overhead of AlexNet is greater than other DNNs, which are significantly reduced by using cryptographic hardware and intra-layer pipelines. Table 3 below illustrates the effect of GuardiaNN on DNN execution speed.

TABLE 3

| Name | Pager | +Direct Conv | +SRAM Mgmt | +Crypt HW | +IntraLayer Pipelining |
|---|---|---|---|---|---|
| AlexNet [35] | 1.00x | 1.28x | 2.81x | 8.26x | 9.92x |
| DeepID [69] | 1.00x | 1.12x | 7.93x | 13.25x | 13.80x |
| FgptAuth [66] | 1.00x | 2.98x | 7.89x | 15.54x | 16.76x |
| GAZEL [58] | 1.00x | 8.68x | 20.59x | 26.21x | 26.54 |
| MobileNetV1 [25] | 1.00x | 1.59x | 3.31x | 5.90x | 6.54x |
| Smart Doll [11] | 1.00x | 8.44x | 22.20x | 30.58x | 31.45x |
| Tiny Darknet [63] | 1.00x | 1.10x | 4.11x | 8.32x | 9.35x |
| VGG-7 [37] | 1.00x | 3.59x | 19.28x | 25.26x | 25.94x |

As shown in Table 3, the GuardiaNN proposed in the present disclosure may accelerate the execution of a wide range of DNNs without compromising security guarantees.

High Energy Efficiency

The energy consumption of DNN execution is examined in all configurations for each DNN in the benchmark. First, average powers across the device in idle state and during DNN execution are measured, and the two values are subtracted to calculate an average power increase due to DNN execution. The energy consumption of the DNN execution is calculated by multiplying the average power increase by the latency. The normalized results are shown in (b) of FIG. 15. It can be observed that energy consumption decreases as each proposed technique is applied. Compared to the basic framework, energy consumption of GuardiaNN is reduced by a geometric mean of 92.3%, resulting in improvement of 15.2 times in energy efficiency. This may be due to the significant reduction in latency provided by GuardiaNN. Even after applying the proposed technique, the overall power of the device remains at the same level during DNN execution. Combined with reduced latency, GuardiaNN achieves significantly higher energy efficiency than the basic framework.

Sensitivity Studies

Figure 16:
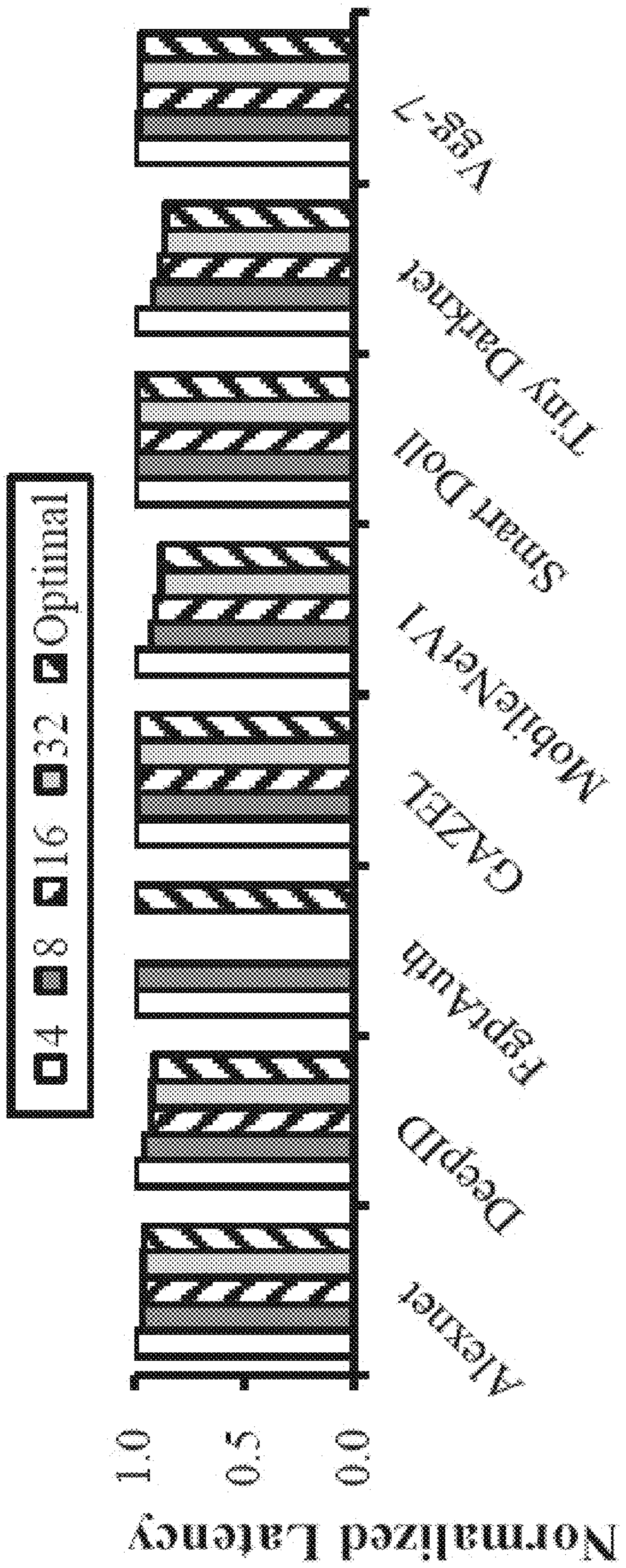

To study the effect of the bulk size of intra-layer pipelining on DNN execution speed, DNN execution latency of GuardiaNN is measured with four bulk sizes (4, 8, 16, and 32 output channels). FIG. 16 illustrates measurements normalized to bulk size 4. In addition to the four bulk sizes, a set of optimal bulk sizes for each optimal layer that lead each DNN to the lowest latency was calculated and the latency was measured as follows. It can be observed that intra-layer pipelining improves latency up to 14.24% with optimal bulk size (fifth bar in FIG. 16), which is compared to the bulk size with the highest latency. For most DNNs, latency tends to decrease as the bulk size increases. This is because a larger bulk size reduces the number of encryption and decryption requests (and interrupts) to the cryptographic hardware. This effectively reduces the latency of the pipeline computation operations, reducing the overall latency. However, bulk size is bound to SRAM capacity. For example, if a bulk size greater than 8 is used for FgptAuth, the required memory size exceeds the SRAM size. This is why the execution latency of FgptAuth with bulk sizes of 16 and 32 is empty in FIG. 16.

Figure 17:
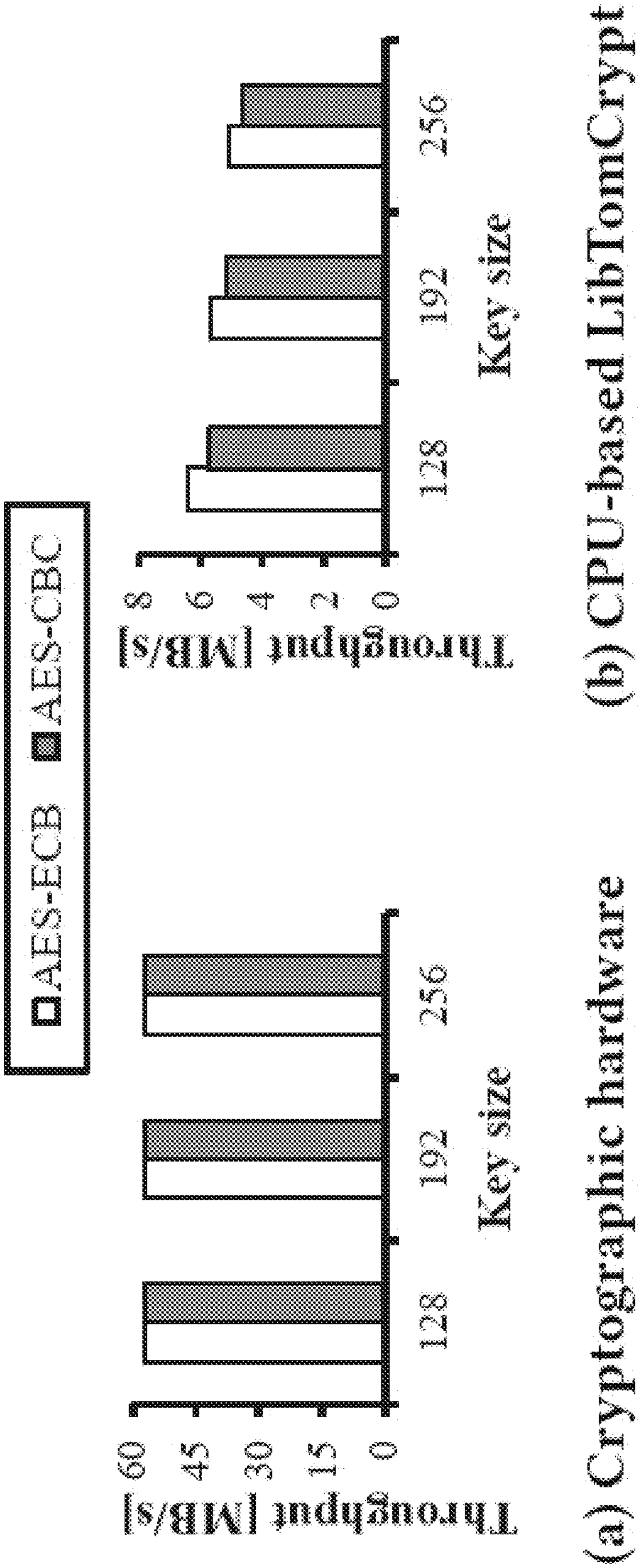

The DMA-capable cipher hardware used by GuardiaNN supports several block ciphers and operation modes. GuardiaNN uses AES for enhanced security, and here two operation modes of AES-ECB and AES-CBC are compared. The throughput of AES-ECB and AES-CBC encryption and decryption with various key sizes is measured by executing in a CPU with (a) cryptographic hardware and (b) basic CPU-based cryptographic library of OP-TEE, LibTom- Crypt. FIG. 17 illustrates the measured throughput. It was observed that AES-ECB and AES-CBC was executed much faster on cryptographic hardware than on CPU using LibTomCrypt. Additionally, longer key sizes result in more rounds in AES encryption and decryption, so CPU throughput using LibTom-Crypt decreases as key size increases. Comparing the operation modes, AES-CBC has slightly less throughput than AES-ECB due to chaining. Conversely, in cryptographic hardware neither key size nor operation mode has a noticeable impact on throughput. This is because encryption and decryption performance is limited by cryptographic hardware and DMA buffer management costs. Still, the cryptographic hardware used by GuardiaNN provides significantly higher encryption and decryption efficiencies than CPUs in all cases.

As interest in executing DNNs on mobile and embedded devices has increased, various technologies have emerged to accelerate DNN execution on those devices. However, there are still many privacy issues because the data processed within devices, such as federated learning is based on differential privacy. Therefore, it is a reasonable direction to utilize a trusted execution environment for DNNs. For example, SecureTF is a distributed secure machine learning framework based on TensorFlow that utilizes a trusted execution environment. PPFL accelerates secure federated learning by utilizing a trusted execution environment for local training and aggregation, and multi-part ML. Chiron and Myelin enable a trusted execution environment as a service in machine learning.

DarkneTZ, Infenclave, and Slalom all propose execution of parts of DNNs within a trusted execution environment. However, naively applying the approach by exposing the remaining layers to attack incurs a significant amount of performance overhead. To solve this problem, HybridTEE proposes requesting DNN execution to the trusted execution environment of a remote server. However, the acceleration effect of HybridTEE is not significant because it does not optimize the DNN execution in the local trust execution environment.

The present disclosure not only proposes complete protection of DNNs in a local trusted execution environment, but may also provide remarkable speed-up to enable execution in real mobile and embedded environments.

DNN Encryption

Another direction to secure DNNs is to encrypt DNN data. For example, SecureML utilized secure multiparty computation to build a scalable, privacy-preserving DNN framework. SoftME provides a reliable environment and executes reliable operations including encryption and decryption and computational operations. Executing a DNN with SoftME guarantees confidentiality, but uses the CPU for data encryption and decryption and incurs a large performance overhead. Among them, homomorphic encryption may be promising because it enables operations on encrypted data. CryptoNets demonstrates that such an idea is feasible and extends the idea to security education. MiniONN proposes a technique to transform a pre-trained DNN not to be awared. It also configures a secure federated transfer learning protocol by utilizing homomorphic encryption. However, homomorphic encryption has low computational throughput and is often considered impractical for mobile and embedded devices.

TEE is a popular commercial implementation of ARM TrustZone and Intel SGX, which is attracting attention due to high security guarantee thereof. Although software-based security solutions may be applied, they have been successfully exploited to protect various applications. However, there are many threats targeting TEE systems, such as cached architectures, dual-instanced applications or nested applications. Accordingly, there are several recent proposals for strengthening security. In addition, many works have been proposed to alleviate the difficulties of utilizing TEE. A minimal kernel builds a small kernel to solve the TEE's limited memory problem. CoSMIX allows application-level secure page fault handlers. TEEMon is a performance monitoring framework for TEE.

The AI device based on a trust environment according to the present disclosure isolates execution of an artificial neural network in a trust execution environment and encrypts data stored in DRAM having a slow operating speed to enhance security. In addition, the number of DRAM accesses may be reduced through direct convolution and SRAM management, and data encryption and decryption may be offloaded to cryptographic hardware and pipelining may be implemented to perform neural network computations overlapping with data encryption and decryption operations, thereby accelerating the execution of artificial neural networks.

While the present disclosure has been described with reference to the embodiments, it is to be understood that the present disclosure may be variously modified and changed by those skilled in the art without departing from the spirit and scope of the invention as defined by the appended claims.

DETAILED DESCRIPTION OF MAIN ELEMENTS

100: AI device based on trust environment
110: first type memory
130: trust AI processing unit
131: Cryptographic front-end process
133 second type memory
135 processor

What is claimed is:

1. An artificial intelligence (AI) device based on a trust environment, the AI device comprising:

a first type memory configured to transmit encrypted input data and receive encrypted output data; and a trust AI processing unit configured to operate in a trust space and perform AI computation of the encrypted input data and encrypted output data, wherein the trust AI processing unit includes:

a cryptographic processing front-end processor configured to receive the encrypted input data from the first type memory, generate decrypted input data through decryption of the encrypted input data, perform encryption of non-encrypted output data to generate the encrypted output data, and store the decrypted input data in a second type memory;

the second type memory configured to provide a buffer for storing the decrypted input data received from the cryptographic processing front-end processor and the non-encrypted output data; and a processor configured to access the decrypted input data stored in the second type memory, perform a neural network computation based on the accessed decrypted input data to generate the non-encrypted output data, and store a decryption input activation in the second type memory in a non-circular queue manner and store a decryption filter and a non-encryption output activation in the second type memory in a circular queue manner.

2. The AI device of claim 1, wherein the cryptographic processing front-end processor is configured to receive an encryption input activation and an encryption filter, as the encrypted input data, from the first type memory.

3. The AI device of claim 1, wherein the cryptographic processing front-end processor is configured to receive an on-demand request by the processor during the AI computation and access the first type memory to import the encrypted input data.

4. The AI device of claim 1, wherein the second type memory has a faster operating speed and a smaller storage capacity than the first type memory.

5. The AI device of claim 1, wherein the processor is configured to directly perform a convolution-based neural network computation to reduce a number of accesses to the first type memory.

6. The AI device of claim 1, wherein the processor is configured to perform data transmission and reception with the first and second type memories through interrupt-driven offloading of the cryptographic processing front-end processor.

7. The AI device of claim 1, wherein the processor is configured to perform data transmission and reception with the cryptographic processing front-end processor and the first and second type memories through direct memory access (DMA)-driven offloading of a DMA controller.

8. The AI device of claim 1, wherein the processor is configured to implement intra-layer pipelining by performing the neural network computation to overlap with the encryption and decryption operations performed by the cryptographic processing front-end processor.

9. The AI device of claim 8, wherein the processor is configured to perform the neural network computation by allowing the cryptographic processing front-end processor to perform a decryption operation of the encrypted input data in a middle of performing the neural network computation.

10. The AI device of claim 8, wherein the processor is configured to perform the neural network computation by subdividing a data decryption operation, a calculation operation, and a data encryption operation for the intra-layer pipelining.

11. An artificial intelligence (AI) device based on a trust environment, the AI device comprising:

a first type memory configured to transmit encrypted input data; and a trust AI processing unit configured to operate in a trust space and perform an AI computation of the encrypted input data, wherein the trust AI processing unit includes:

a cryptographic processing front-end processor configured to receive the encrypted input data from the first type memory, generate decrypted input data through decryption of the encrypted input data, and store the decrypted input data in a second type memory;

the second type memory configured to provide a buffer for storing the decrypted input data received from the cryptographic processing front-end processor and non-encrypted output data; and a processor configured to access the decrypted input data stored in the second type memory, perform a neural network computation based on the accessed decrypted input data to generate the non-encrypted output data, and store a decryption input activation in the second type memory in a non-circular queue manner and store a decryption filter and a non-encryption output activation in the second type memory in a circular queue manner.

12. The AI device of claim 11, wherein the processor is configured to reduce a number of accesses to the first type memory by performing a direct convolution-based neural network computation.

13. The AI device of claim 11, wherein the processor is configured to implement intra-layer pipelining by performing the neural network computation to overlap with the encryption and decryption operations performed by the cryptographic processing front-end processor.

* * * * *